United States Patent
Chai et al.

(10) Patent No.: US 11,304,054 B2
(45) Date of Patent: Apr. 12, 2022

(54) COMMUNICATION METHOD AND DEVICE

(71) Applicant: Huawei Technologies Co., Ltd., Shenzhen (CN)

(72) Inventors: Li Chai, Shenzhen (CN); Jian Zhang, Beijing (CN); Bingzhao Li, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 16/579,368

(22) Filed: Sep. 23, 2019

(65) Prior Publication Data
US 2020/0021978 A1 Jan. 16, 2020

Related U.S. Application Data

(63) Continuation of application No. PCT/CN2018/080129, filed on Mar. 23, 2018.

(30) Foreign Application Priority Data

Mar. 24, 2017 (CN) .......................... 201710186514.4

(51) Int. Cl.
*H04W 76/25* (2018.01)
*H04W 76/27* (2018.01)
(Continued)

(52) U.S. Cl.
CPC ......... *H04W 12/03* (2021.01); *H04W 12/041* (2021.01); *H04W 12/10* (2013.01); *H04W 76/25* (2018.02); *H04W 76/27* (2018.02)

(58) Field of Classification Search
CPC ........... H04W 12/001; H04W 12/0017; H04W 12/0401; H04W 12/10; H04W 76/25; H04W 76/27; H04W 12/041
See application file for complete search history.

(56) References Cited

U.S. PATENT DOCUMENTS

2016/0029213 A1* 1/2016 Rajadurai ............. H04W 12/06
380/283
2018/0227851 A1* 8/2018 Kubota ............. H04W 52/0229
(Continued)

FOREIGN PATENT DOCUMENTS

CN 1964259 A 5/2007
CN 101155411 A 4/2008
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.0, Mar. 2017, 721 pages.
(Continued)

*Primary Examiner* — Daniel B Potratz
*Assistant Examiner* — D'Arcy Winston Straub
(74) *Attorney, Agent, or Firm* — Slater Matsil, LLP

(57) ABSTRACT

A communication method and a device, the method including obtaining, by a terminal device, a security key, where the terminal device performs the obtaining while the terminal device is in a state in which the terminal device has disconnected a radio resource control (RRC) connection from a first network device, and in which the terminal device retains context information for a context, in the first network device, of the terminal device, and sending, by the terminal device, a first message to a second network device, where the first message includes an identifier of the terminal device and at least one of encrypted uplink data or encrypted signaling, the at least one of encrypted uplink data or encrypted signaling is encrypted by using the security key, and where the second network device is different from the first network device.

20 Claims, 8 Drawing Sheets

(51) Int. Cl.
  *H04W 12/10* (2021.01)
  *H04W 12/041* (2021.01)
  *H04W 12/03* (2021.01)

(56) References Cited

U.S. PATENT DOCUMENTS

| | | | | |
|---|---|---|---|---|
| 2018/0234839 A1* | 8/2018 | Tenny | ............... | H04W 36/0033 |
| 2018/0279204 A1* | 9/2018 | Kim | ................. | H04W 52/0229 |
| 2018/0352488 A1* | 12/2018 | Selvaganapathy | .... | H04W 36/04 |
| 2020/0029206 A1* | 1/2020 | Zhang | ................ | H04W 12/033 |

FOREIGN PATENT DOCUMENTS

| | | | | |
|---|---|---|---|---|
| CN | 101820622 A | | 9/2010 | |
| KR | 20180106623 A | * | 10/2018 | ........ H04W 52/0229 |
| WO | 2009152755 A1 | | 12/2009 | |

OTHER PUBLICATIONS

"Discussion on LS R2-1700656 on Small data transmission," Source: Nokia, Document for: Discussion and approval, Agenda Item: 7.6.14, Work Item / Release: FS_NR_newRAT/R14, 3GPP TSG SA WG3 (Security) Meeting #86, S3-170113, Feb. 6-10, 2017, 3 pages.

"Security Solution for Key Handling in State Transition from RRC Inactive State to RRC Connected State," Source: Ericsson, Document for: Approval, Agenda Item: 5.1.4, 3GPP TSG SA WG3 (Security) Meeting #86-Bis, S3-170738, Mar. 27-31, 2017, 4 pages.

"3rd Generation Partnership Project; Technical Specification Group Services and System Aspects; 3GPP System Architecture Evolution (SAE); Security Architecture (Release 9)," 3GPP TS 33.104, V9.3.1, Apr. 2010, 104 pages.

"3rd Generation Partnership Project; Technical Specification Group Radio Access Network Evolved Universal Terrestrial Radio Access Network (E-UTRAN); S1 Application Protocol (S1AP) (Release 14)," 3GPP TS 36.413 V14.1.0, Jan. 2017, 333 pages.

"3rd Generation Partnership Project; Technical Specification Group Radio Access Network; Evolved Universal Terrestrial Radio Access Network (E-UTRAN); X2 application protocol (X2AP) (Release 14)," 3GPP TS 36.423 V14.1.0, Jan. 2017, 240 pages.

"Details of Solution B for Small Data Transmission in RRC_Inactive," Agenda Item: 10.2.2.2, Source: Ericsson, Document for: Discussion, Decision, 3GPP TSG-RAN WG2 #97, Tdoc R2-1700890, Feb. 13-17, 2017, 7 pages.

* cited by examiner

COMMUNICATION METHOD AND DEVICE

CROSS-REFERENCE TO RELATED APPLICATIONS

This application is a continuation of International Application No. PCT/CN2018/080129, filed on Mar. 23, 2018, which claims priority to Chinese Patent Application No. 201710186514.4, filed on Mar. 24, 2017. The disclosures of the aforementioned applications are hereby incorporated by reference in their entireties.

TECHNICAL FIELD

This application relates to the communications field, and more specifically, to a communication method and a device.

BACKGROUND

An inactive state of a terminal device is a state in which the terminal device disconnects a radio resource control (RRC) connection from a radio access network (RAN) device but retains a context of the terminal device. In the inactive state, when being moved to a cell of a new RAN device, the terminal device may send uplink data to the new RAN device (which may also be referred to as a switched-to RAN device) based on the previously retained context of the terminal device.

In current technologies, no technology is available for ensuring security of data transmission between the terminal device in the inactive state and the switched-to RAN device.

SUMMARY

This application provides a communication method and a device, to effectively improve security of communication between a terminal device in an inactive state and a network device.

According to a first aspect, a communication method is provided. The method includes obtaining, by a terminal device, a security key, where the terminal device is in a state in which the terminal device disconnects a radio resource control RRC connection from a first network device but retains context information that is of the terminal device and that is in the first network device, and sending, by the terminal device, a first message to a second network device, where the first message includes an identifier of the terminal device and encrypted uplink data and/or signaling, the encrypted uplink data and/or signaling is encrypted by using the security key, and the second network device is different from the first network device.

In this application, the security key is used for encryption during communication between the terminal device in the inactive state and the network device, so that communication security can be improved.

With reference to the first aspect, in a possible implementation of the first aspect, the security key includes a key stored in the context information.

In this application, during communication with a new network device, the terminal device in the inactive state performs encryption by using a key stored in context information of a network device on which the terminal device previously camps, so that security of communication with the new network device can be improved at relatively low overheads.

With reference to the first aspect, in a possible implementation of the first aspect, the security key is different from a key that is used by the terminal device to communicate with the first network device.

In this application, the terminal device in the inactive state uses different keys for communication with different network devices, so that communication security can be effectively improved.

With reference to the first aspect, in a possible implementation of the first aspect, the obtaining, by a terminal device, a security key includes: obtaining, by the terminal device, the security key based on identification information of the second network device, where the identification information of the second network device includes cell information of the second network device and/or frequency information of the second network device.

In this application, the security key is generated based on the identification information of the network device, and the security key is used for encryption during communication with the network device, so that communication security can be effectively improved.

With reference to the first aspect, in a possible implementation of the first aspect, the obtaining, by a terminal device, a security key includes: obtaining, by the terminal device, the security key based on identification information of the second network device and a key that is stored in the context information, where the identification information of the second network device includes cell information of the second network device and/or frequency information of the second network device.

In this application, a security key is generated based on a key stored in initial context information of the terminal device and identification information of a new network device, and the security key is used for encryption during communication with the network device, so that communication security can be effectively improved.

With reference to the first aspect, in a possible implementation of the first aspect, the communication method further includes: obtaining, by the terminal device, security information that is configured by the first network device for the terminal device; and the obtaining, by a terminal device, a security key includes obtaining, by the terminal device, the security key based on the security information and identification information of the second network device, where the identification information of the second network device includes cell information of the second network device and/or frequency information of the second network device, or obtaining, by the terminal device, the security key based on the security information and identification information of the first network device, where the identification information of the first network device includes cell information of the first network device and/or frequency information of the first network device.

In this application, a security key is generated based on the identification information of the network device and a key that is stored in initial context information of the terminal device, and the security key is used for encryption during communication with the network device, so that communication security can be effectively improved.

With reference to the first aspect, in a possible implementation of the first aspect, the obtaining, by a terminal device, a security key includes: obtaining, by the terminal device, the security key by further using any one of the following information: a counter value carried in the context information, a counter value obtained from the first network device, a counter value carried in a system message of the first network device, or a counter value predefined by a system.

With reference to the first aspect, in a possible implementation of the first aspect, the first message further includes a message authentication code for integrity (MAC-I) or a short message authentication code for integrity (short-MAC-I).

In this application, integrity of data transmission between the terminal device and the second network device can be protected.

With reference to the first aspect, in a possible implementation of the first aspect, the identifier of the terminal device is an identifier that is configured by the first network device for the terminal device in the inactive state, or the identifier of the terminal device is an identifier that is configured by the first network device for the terminal device in a connected state.

With reference to the first aspect, in a possible implementation of the first aspect, the first message includes the uplink data, and the communication method further includes after the terminal device is moved to a cell of the second network device, obtaining, by the terminal device, a system message of the second network device, where the system message includes user plane preconfiguration parameter information corresponding to at least one service and determining, by the terminal device, the uplink data based on the service corresponding to the preconfiguration parameter information.

With reference to the first aspect, in a possible implementation of the first aspect, the preconfiguration parameter information includes at least one of the following information: packet data convergence protocol (PDCP) information, radio link control (RLC) information, media access control (MAC) information, or physical layer (PHY) information.

In this application, the terminal device can send data of the at least one service to the second network device based on the preconfiguration parameter information without establishing an RRC connection to the second network device, so that efficiency of data transmission between the terminal device in the inactive state and the network device is improved.

With reference to the first aspect, in a possible implementation of the first aspect, the first message is sent by using a user plane data packet.

With reference to the first aspect, in a possible implementation of the first aspect, the communication method further includes: obtaining, by the terminal device, an uplink resource of the second network device based on preconfigured resource information included in a system message of the second network device; or obtaining, by the terminal device, an uplink resource of the second network device by performing a random access process.

With reference to the first aspect, in a possible implementation of the first aspect, the first message further includes the identification information of the first network device, so that the second network device sends the uplink data and/or the signaling to the core network by using the first network device, where the identification information of the first network device includes the cell information of the first network device and/or device information of the first network device, and the signaling is non-access stratum signaling.

In this application, the second network device forwards the uplink data and/or the signaling of the terminal device to the core network by using the first network device on which the terminal device previously camps, so that communication efficiency can be improved, and costs can be reduced.

With reference to the first aspect, in a possible implementation of the first aspect, the first message is sent by using RRC signaling.

With reference to the first aspect, in a possible implementation of the first aspect, the communication method further includes: receiving, by the terminal device, a response message sent by the second network device, where the response message includes at least one of the following information: the identifier of the terminal device, information for instructing whether to update the context information, information for instructing whether to enter an RRC connected state, information for instructing whether to remain in the inactive state, new security information, update information of a radio access network area, information for instructing to enter the RRC connected state, information for instructing to remain in the inactive state, or information for instructing to enter an RRC idle state.

According to a second aspect, a communication method is provided. The communication method includes receiving, by a second network device, a first message sent by a terminal device, where the first message includes an identifier of the terminal device and encrypted uplink data and/or signaling, the encrypted uplink data and/or signaling is encrypted by using a security key, the terminal device is in a state in which the terminal device disconnects a radio resource control (RRC) connection from a first network device but retains context information that is of the terminal device and that is in the first network device, and the first network device is different from the second network device, obtaining, by the second network device, information about the security key by using the first network device, and parsing, by the second network device, the uplink data and/or the signaling based on the information about the security key.

In this application, the security key is used for encryption during communication between the terminal device in the inactive state and the network device, so that communication security can be improved.

With reference to the second aspect, in a possible implementation of the second aspect, the security key includes a key stored in the context information.

In this application, during communication with a new network device, the terminal device in the inactive state performs encryption by using a key stored in context information of a network device on which the terminal device previously camps, so that security of communication with the new network device can be improved at relatively low overheads.

With reference to the second aspect, in a possible implementation of the second aspect, the security key is different from a key that is used by the terminal device to communicate with the first network device.

In this application, the terminal device in the inactive state uses different keys for communication with different network devices, so that communication security can be effectively improved.

With reference to the second aspect, in a possible implementation of the second aspect, the security key is determined based on identification information of the second network device, and the identification information of the second network device includes cell information of the second network device and/or frequency information of the second network device.

In this application, the security key is generated based on the identification information of the network device, and the security key is used for encryption during communication with the network device, so that communication security can be effectively improved.

With reference to the second aspect, in a possible implementation of the second aspect, the obtaining, by a terminal device, a security key includes: obtaining, by the terminal device, the security key based on identification information of the second network device and a key that is stored in the context information, where the identification information of the second network device includes cell information of the second network device and/or frequency information of the second network device.

In this application, a security key is generated based on a key stored in initial context information of the terminal device and identification information of a new network device, and the security key is used for encryption during communication with the network device, so that communication security can be effectively improved.

With reference to the second aspect, in a possible implementation of the second aspect, the security key is determined based on identification information of the second network device and security information that is configured by the first network device for the terminal device, and the identification information of the second network device includes cell information of the second network device and/or frequency information of the second network device, or the security key is determined based on identification information of the first network device and the security information, and the identification information of the first network device includes cell information of the first network device and/or frequency information of the first network device.

In this application, a security key is generated based on the identification information of the network device and a key that is stored in initial context information of the terminal device, and the security key is used for encryption during communication with the network device, so that communication security can be effectively improved.

With reference to the second aspect, in a possible implementation of the second aspect, it is determined that the information about the security key further includes any one of the following information: a counter value stored in the context information, a counter value obtained by the terminal device from the first network device, a counter value carried in a system message of the first network device, or a counter value predefined by a system.

With reference to the second aspect, in a possible implementation of the second aspect, the first message further includes a message authentication code for integrity (MAC-I) or a short message authentication code for integrity (short-MAC-I).

In this application, integrity of data transmission between the terminal device and the second network device can be protected.

With reference to the second aspect, in a possible implementation of the second aspect, the first message includes the uplink data, and a system message of the second network device includes user plane preconfiguration parameter information corresponding to at least one service, so that the terminal device determines the uplink data based on the service corresponding to the preconfiguration parameter information.

With reference to the second aspect, in a possible implementation of the second aspect, the preconfiguration parameter information includes at least one of the following information: packet data convergence protocol (PDCP) information, radio link control (RLC) information, media access control (MAC) information, or physical layer (PHY) information.

In this application, the terminal device can send data of the at least one service to the second network device based on the preconfiguration parameter information without establishing an RRC connection to the second network device, so that efficiency of data transmission between the terminal device in the inactive state and the network device is improved.

With reference to the second aspect, in a possible implementation of the second aspect, the first message is sent by using a user plane data packet.

With reference to the second aspect, in a possible implementation of the second aspect, the first message further includes the identification information of the first network device, and the identification information of the first network device includes the cell information of the first network device and/or device information of the first network device; and the communication method further includes sending, by the second network device, the uplink data and/or the signaling to the first network device based on the identification information of the first network device, so that the first network device sends the uplink data to a core network, where the signaling is non-access stratum signaling.

In this application, the second network device forwards the uplink data and/or the signaling of the terminal device to the core network by using the first network device on which the terminal device previously camps, so that communication efficiency can be improved, and costs can be reduced.

With reference to the second aspect, in a possible implementation of the second aspect, the first message includes the uplink data, and the communication method further includes obtaining, by the second network device, the context information, establishing, by the second network device, a communication path to the core network based on the context information, and sending, by the second network device, the uplink data to the core network along the communication path.

In this application, the second network device forwards the uplink data of the terminal device to the core network based on the context information of the terminal device, so that communication efficiency can be improved.

With reference to the second aspect, in a possible implementation of the second aspect, the obtaining, by the second network device, the context information includes obtaining, by the second network device, the context information based on the context information notification message sent by the first network device, or requesting, by the second network device, the context information from the first network device.

With reference to the second aspect, in a possible implementation of the second aspect, the communication method further includes obtaining, by the second network device, information about a new next hop chaining counter NCC from the core network, and sending, by the second network device, the new NCC to the terminal device, so that the terminal device is instructed to determine a new security key by using the new NCC and encrypt, by using the new security key, uplink data to be sent next time.

In this application, after data transmission between the second network device and the terminal device is performed at least once, a newer security key is determined, so that data transmission security can be further improved.

With reference to the second aspect, in a possible implementation of the second aspect, the communication method further includes determining, by the second network device based on at least one of the following information, whether the context information needs to be updated: an amount of the uplink data of the terminal device, a sending frequency of the uplink data of the terminal device, load of the second network device, a quantity of users connected to the second network device, or uplink service information of the terminal device.

With reference to the second aspect, in a possible implementation of the second aspect, the communication method further includes sending, by the second network device, a response message for the first message to the terminal device, where the response message includes at least one of the following information: the identifier of the terminal device, information for instructing whether to update the context information, information for instructing whether to enter an RRC connected state, information for instructing whether to remain in the inactive state, new security information, update information of a radio access network area, information for instructing to enter the RRC connected state, information for instructing to remain in the inactive state, or information for instructing to enter an RRC idle state.

According to a third aspect, a terminal device is provided. The terminal device is configured to perform the communication method in the first aspect or any possible implementation of the first aspect. Specifically, the terminal device may include modules configured to perform the communication method in the first aspect or any possible implementation of the first aspect.

According to a fourth aspect, a terminal device is provided. The terminal device includes a memory and a processor. The memory is configured to store an instruction. The processor is configured to execute the instruction stored in the memory, to perform the method in the first aspect or any possible implementation of the first aspect.

According to a fifth aspect, a computer readable storage medium is provided, where the computer readable storage medium stores a computer program. When the program is executed by a processor, the method in the first aspect or any possible implementation of the first aspect is implemented.

According to a sixth aspect, a network device is provided. The network device is configured to perform the communication method in the second aspect or any possible implementation of the second aspect. Specifically, the network device may include modules configured to perform the communication method in the second aspect or any possible implementation of the second aspect.

According to a seventh aspect, a network device is provided. The network device includes a memory and a processor. The memory is configured to store an instruction. The processor is configured to execute the instruction stored in the memory, to perform the method in the second aspect or any possible implementation of the second aspect.

According to an eighth aspect, a computer readable storage medium is provided, where the computer readable storage medium stores a computer program. When the program is executed by a processor, the method in the second aspect or any possible implementation of the second aspect is implemented.

In this application, the security key is used for encryption during communication between the terminal device in the inactive state and the network device, so that communication security can be improved.

DETAILED DESCRIPTION OF ILLUSTRATIVE EMBODIMENTS

Figure 1:
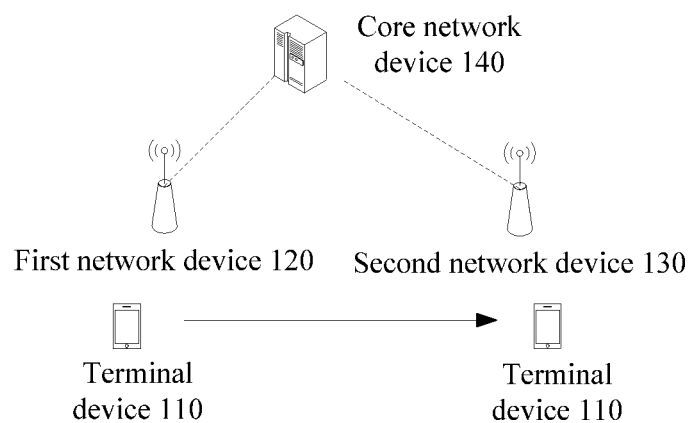
FIG. 1 is a schematic architectural diagram of a system according to an embodiment of this application.

The following describes technical solutions in this application with reference to accompanying drawings.

It should be understood that the technical solutions in embodiments of this application may be applied to a long term evolution (LTE) architecture, and may also be applied to a universal mobile telecommunications system (UMTS) terrestrial radio access network (UTRAN) architecture, or a global system for mobile communications (GSM)/enhanced data rates for GSM evolution (EDGE) system radio access network (GERAN) architecture. In the UTRAN architecture or the GERAN architecture, a function of an MME is implemented by a serving general packet radio service (GPRS) support node (SGSN), and a function of an SGW/a PGW is implemented by a gateway GPRS support node (GGSN). The technical solutions in the embodiments of this application may also be applied to another communications system, such as a public land mobile network (PLMN) system, or even a future 5G communications system or a communications system after 5G. This is not limited in the embodiments of this application.

The embodiments of this application relate to a terminal device. The terminal device may be a device that includes a wireless transceiver function and that can cooperate with a network device to provide a communication service for a user. Specifically, the terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. For example, the terminal device may be a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a future 5G network or a network after 5G. This is not limited in the embodiments of this application.

The embodiments of this application further relate to a network device. The network device may be a device configured to communicate with a terminal device. For example, the network device may be a base transceiver station (BTS) in a GSM system or a CDMA system, may be a NodeB (NB) in a WCDMA system, or may be an evolved NodeB (Evolutional Node B, eNB or eNodeB) in an LTE system. Alternatively, the network device may be a relay station, an access point, an in-vehicle device, a wearable device, a network side device in a future 5G network or a network after 5G, a network device in a future evolved PLMN network, or the like.

The network device in the embodiments of this application may also be referred to as a radio access network (RAN) device. The RAN device is connected to the terminal device, and configured to receive data from the terminal device and send the data to a core network device. The RAN device corresponds to different devices in different communications systems, for example, corresponds to a base transceiver station and a base station controller in a 2G system, corresponds to a NodeB and a radio network controller (RNC) in a 3G system, corresponds to an evolved NodeB (eNB) in a 4G system, and corresponds to an access network device (for example, a 5G New Radio base station (gNB), a central unit (CU), or a distributed unit (DU)) in a 5G system, such as a new radio (New Radio Access Technology, NR) access system.

The embodiments of this application further relate to a core network (CN) device. The CN device corresponds to different devices in different communications systems, for example, corresponds to a serving GPRS support node (SGSN) or a gateway GPRS support node (GGSN) in a 3G system, corresponds to a mobility management entity (MME) or a serving gateway (S-GW) in a 4G system, and corresponds to a core network-related device (for example, an NG-Core) in a 5G system.

To facilitate understanding of this application, several elements used in description of this application are first described herein:

Connected state: In this state, a radio resource control (RRC) connection is established between a terminal device and a radio access network (RAN) device.

Context information: After the RRC connection is established between the RAN device and the terminal device, the RAN device allocates context information to the terminal device, and the RAN device communicates with the terminal device based on the context information.

Specifically, the context information includes identification information of the terminal device, security context information of the terminal device, subscription information of the terminal device, radio bearer configuration information of the terminal device, logical channel information, and Network Slicing Info. The Network Slicing Info includes pieces of network slicing with which the terminal device currently registers and an address of a control plane (CP) Function in each piece of network slicing. The radio bearer configuration information of the terminal device includes at least one of the following: a PDCP configuration parameter, an RLC configuration parameter, a MAC configuration parameter, and/or a PHY configuration parameter; a value/values of a PDCP variable, counter, and/or timer; a value/values of a RLC variable, counter, and/or timer; a value/values of a MAC variable, counter, and/or timer; and/or a value/values of a physical layer PHY variable, counter, and/or timer, for example, a COUNT of PDCP packets or an SN of a PDCP packet.

Inactive state (also referred to as a suspend state or a light connection state): In this state, there is no RRC connection between the terminal device and the RAN device, but both the RAN device and the terminal device store the context information, and the RRC connection between the terminal device and the RAN device may be resumed by using a resume message. Optionally, a data radio bearer (DRB) for data transmission between the terminal device and the RAN device may be further resumed. An S1 interface of the terminal device is anchored to a base station (which may be referred to as an "anchor base station"), and then cell reselection mobility may be performed. When the terminal device is moved to a predetermined area (for example, referred to as a "RAN-based paging area" or a "radio access network area"), the base station does not need to be notified. However, once the terminal device is moved out of the RAN-based paging area, the base station needs to be notified of a location of the terminal device. This process is referred to as RAN-based paging area update. The "inactive state" mentioned in the embodiments of this application is merely used to describe this state, instead of constituting any limitation.

It should be noted that the terms, such as the inactive state, the anchor base station, and the radio access network area (or RAN-based paging area) update, in this specification are used for differentiation only for ease of description and are not used for limiting the scope of the embodiments of this application.

Idle state: In this state, there is no RRC connection between the terminal device and the RAN device, and the terminal device and the RAN device no longer store the context information.

Identifier of the terminal device: It is an identifier that can uniquely identify the terminal device. The identifier may be an identifier allocated by the RAN device to the terminal device, or may be an identifier allocated by a control plane device (CP Function) to the terminal device.

FIG. 1 is a schematic architectural diagram of a system according to an embodiment of this application. A terminal device no initially establishes an RRC connection to a first network device 120. The first network device 120 allocates context information to the terminal device no. The terminal device communicates with the first network device 120 through the RRC connection, for example, accesses a core network 140 by using the first network device 120. Then the terminal device no disconnects the RRC connection from the first network device 120, but retains the context information that is of the terminal device no and that is in the first network device 120, that is, enters an inactive state. The terminal device no is moved to a second network device 13o. When being moved to a cell of the second network device 13o, the terminal device no performs communication and transmission with the second network device 130 based on the previously retained context information, for example, accesses the core network 140 by using the first network device 120.

Figure 2:
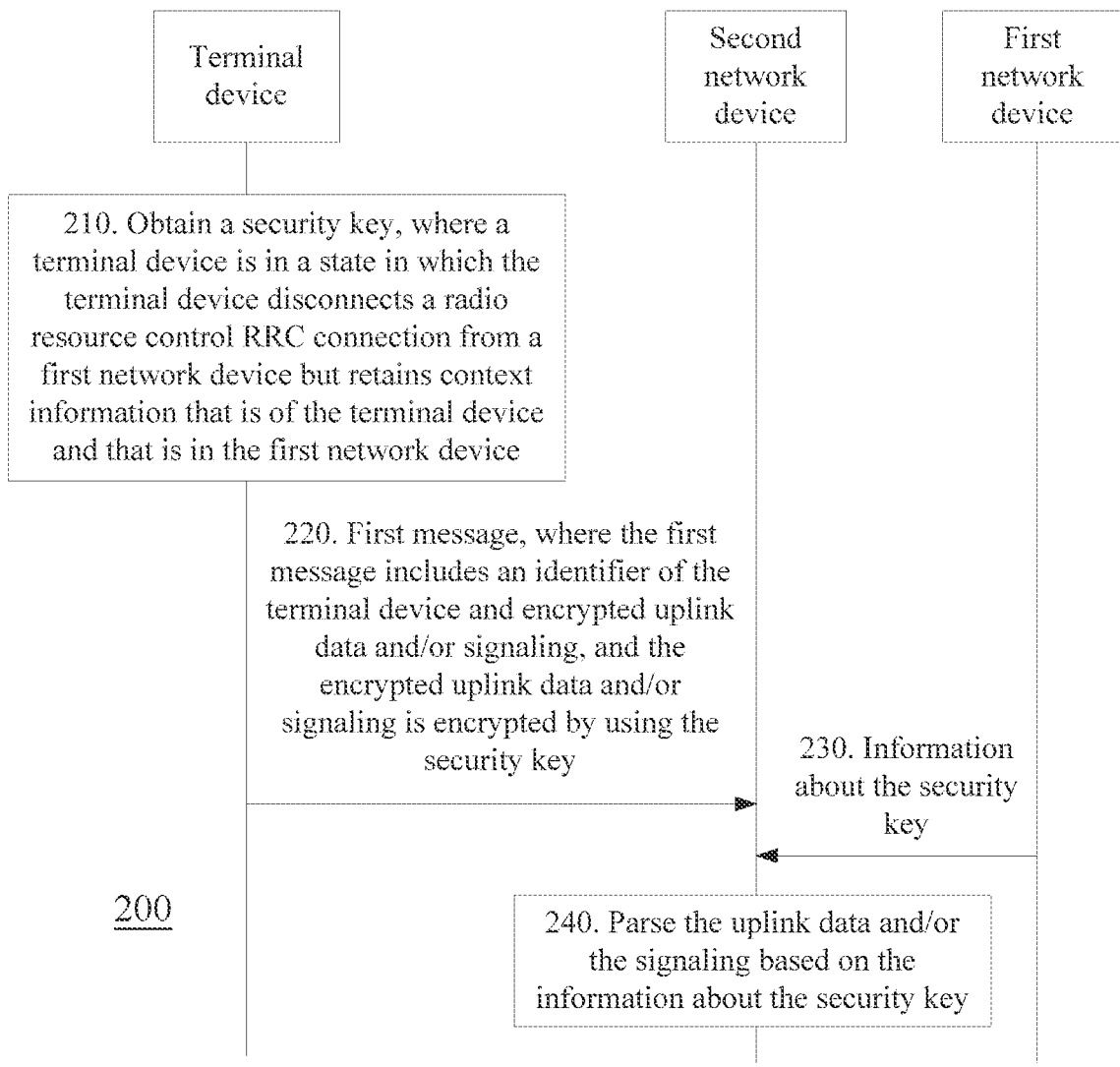
FIG. 2 is a schematic flowchart of a communication method according to an embodiment of this application.

FIG. 2 is a schematic flowchart of a communication method 200 according to an embodiment of this application. A terminal device, a first network device, and a second network device that are described in FIG. 2 may respectively correspond to the terminal device no, the first network device 120, and the second network device 130 that are shown in FIG. 1. As shown in FIG. 2, the method 200 includes the following steps.

210. The terminal device obtains a security key, where the terminal device is in a state in which the terminal device disconnects a RRC connection from the first network device but retains context information that is of the terminal device and that is in the first network device.

Optionally, the terminal device may determine the security key based on a key stored in the context information, or may determine the security key with reference to other information and/or a key stored in the context information. Details are described below.

For ease of description, in the following description, an inactive state is used to represent the state in which the terminal device disconnects the RRC connection from the first network device but retains the context information that is of the terminal device and that is in the first network device.

220. The terminal device sends a first message to the second network device, where the first message includes an identifier of the terminal device and encrypted uplink data and/or signaling, the encrypted uplink data and/or signaling is encrypted by using the security key, and the second network device is different from the first network device.

The identifier of the terminal device may be an identifier that is configured by the first network device for the terminal device in the inactive state. Alternatively, the identifier of the terminal device is an identifier that is configured by the first network device for the terminal device in a connected state. For example, the identifier of the terminal device includes a resume identifier (resume ID) and/or a context identifier (context ID) of the terminal device.

It should be understood that the second network device can learn, based on the identifier of the terminal device carried in the first message, that the first message is from the terminal device.

Specifically, the uplink data may be service data of the terminal device.

Specifically, the signaling may be non-access stratum signaling or access stratum signaling. The access stratum signaling may be, for example, RAN-based paging area update signaling of the terminal device. When the terminal device is moved out of a previous RAN-based paging area and enters another RAN-based paging area in which the second network device is located, the terminal device needs to report, to the second network device, that the terminal device has left the previous RAN-based paging area, where signaling used in this case may be referred to as RAN-based paging area update signaling. When the terminal device is moved to a predetermined area (for example, a RAN-based paging area), a base station does not need to be notified. However, once the terminal device is moved out of the RAN-based paging area, the terminal device needs to report, to the base station, that the terminal device has left the previous RAN-based paging area. This process is referred to as RAN-based paging area update. Further, the RAN-based paging area update signaling may be periodic RAN-based paging area update signaling of the terminal device. The non-access stratum signaling may be, for example, tracking area (TA) update signaling.

230. The second network device obtains information about the security key by using the first network device.

Specifically, the information about the security key may be information used to generate the security key, or may be the security key.

It should be noted that the security key indicated by the information that is obtained by the second network device from the first network device and that is about the security key is the same as the security key obtained by the terminal device. For example, the terminal device and the first network device generate the security key through system definition or protocol specification according to a same rule or algorithm.

Specifically, the first network device may actively send the information about the security key to the second network device, or the second network device needs to request the information about the security key from the first network device.

240. The second network device parses the uplink data and/or the signaling based on the information about the security key.

Specifically, the second network device may directly or indirectly send the uplink data and/or the signaling to a core network.

Therefore, in this embodiment of this application, the security key is used for encryption during communication between the terminal device in the inactive state and the network device, so that communication security can be improved.

Specifically, before step 210, the method 200 further includes: sending, by the first network device, an RRC release message to the terminal device; and disconnecting, by the terminal device, the RRC connection from the first network device according to the RRC release message, but retaining the context information that is of the terminal device and that is in the first network device, that is, entering, by the terminal device, the inactive state.

Optionally, the RRC release message may include the identifier of the terminal device.

Optionally, the RRC release message may further include at least one of the following information:

(1) Instruction for Instructing the Terminal Device not to Delete a Context:

The information is used to instruct the terminal device not to delete the context information that is of the terminal device and that is in the first network device but to continue storing the context information.

(2) Duration of a Validity Period of the Context of the Terminal Device:

The information is used to notify the terminal device of the validity period for storing the context information. When the context is stored for a period longer than the validity period, the terminal device may delete the context.

(3) User Plane (UP) Configuration Information of a Service that May be Established by the Terminal Device Subsequently:

The UP configuration information is UP configuration information corresponding to one or more services that have not been established when the terminal device currently enters the inactive state. Subsequently, if a user triggers a new service, the terminal device may directly establish the new service based on the information without entering the connected state. The UP configuration information helps improve efficiency of subsequently establishing the new service by the terminal device.

(4) Security Information that is Needed when the Terminal Device Initiates RRC Connection Resumption or Sends Uplink Data Next Time:

Specifically, the security information may be dedicated, or may be shared. For example, the security information may include any one or a combination of the following information: a security algorithm, a next hop chaining counter (NCC), a count (COUNT) used to obtain a security key, or another parameter that can be used to obtain a security key.

(5) Cause Value Cause Value Information, for Example, High-Priority Access, Radio Access Area Update, Called Data, or Calling Signaling:

Specifically, in step 210, the terminal device may determine the security key based on the key stored in the context information, or may determine the security key with reference to other information and/or the key stored in the context information.

Optionally, in some embodiments, the security key includes the key stored in the context information.

Specifically, the terminal device determines, as the security key, the key stored in the context information.

It should be understood that the key stored in the context information is a key that is used by the terminal device to communicate with the first network device.

In this embodiment of this application, the security key is used for encryption during communication between the terminal device in the inactive state and the network device, so that communication security can be improved.

Optionally, in some embodiments, the security key is different from the key that is used by the terminal device to communicate with the first network device.

Specifically, the security key may be generated in the following several manners.

In a first implementation, the security key is determined based on identification information of the second network device, and the identification information of the second network device includes cell information of the second network device and/or frequency information of the second network device.

Specifically, the terminal device generates the security key according to a preset algorithm and based on the identification information of the second network device.

The cell information of the second network device is, for example, a cell index of the second network device or a cell identifier of the second network device. The frequency information of the second network device is, for example, frequency channel number information of the second network device, frequency band information of the second network device, or both.

In a second implementation, the security key is determined based on identification information of the second network device and the key that is stored in the context information.

Specifically, the terminal device generates the security key according to a preset algorithm and based on the identification information of the second network device and the key that is stored in the context information.

In a third implementation, the security key is determined based on identification information of the second network device and security information that is configured by the first network device for the terminal device, and the identification information of the second network device includes cell information of the second network device and/or frequency information of the second network device.

Specifically, the terminal device generates the security key according to a preset algorithm and based on the identification information of the second network device and the security information that is allocated by the first network device to the terminal device.

The security information allocated by the first network device to the terminal device is, for example, the foregoing "(4) Security information that is needed when the terminal device initiates RRC connection resumption or sends uplink data next time" configured by the first network device for the terminal device.

Specifically, the security information may be dedicated, or may be shared. For example, the security information may include any one or a combination of the following information: a security algorithm, a next hop chaining counter (NCC), a count (COUNT) used to obtain a security key, or another parameter that can be used to obtain a security key.

Optionally, the terminal device may obtain the security information from the RRC release message sent by the first network device.

In a fourth implementation, the security key is determined based on identification information of the first network device and security information that is allocated by the first network device to the terminal device, and the identification information of the first network device includes cell information of the first network device and/or frequency information of the first network device. The security information allocated by the first network device to the terminal device is, for example, the foregoing "(4) Security information that is needed when the terminal device initiates RRC connection resumption or sends uplink data next time" configured by the first network device for the terminal device.

Specifically, the terminal device generates the security key according to a preset algorithm and based on the identification information of the first network device and the security information that is allocated by the first network device to the terminal device.

The cell information of the first network device is, for example, a cell index of the first network device or a cell identifier of the first network device. The frequency information of the first network device is, for example, frequency channel number information of the first network device, frequency band information of the first network device, or both.

Optionally, in the foregoing manners of obtaining the security key, the terminal device may alternatively generate the security key according to a corresponding algorithm with reference to any one of the following information: a counter value stored in the context information, a counter value obtained from the first network device, a counter value carried in a system message of the first network device, or a counter value predefined by a system.

The counter value obtained from the first network device may be a counter value obtained by the terminal device from the RRC release message sent by the first network device.

The counter value in this specification may be, for example, a value of a data packet (packet) counter.

It should be understood that the foregoing described implementations of obtaining the security key are merely examples, instead of limitation. In actual operation, the security key may be generated through system definition or protocol specification according to a feasible algorithm and with reference to another related parameter.

Therefore, in this embodiment of this application, the security key used by the terminal device in the inactive state to communicate with the second network device is different from the security key used by the terminal device to communicate with the first network device on which the terminal device previously camps, so that security of communication between the terminal device and the second network device can be improved.

Optionally, in step 220, the first message sent by the terminal device to the second network device further includes a message authentication code for integrity (MAC-I) or a short message authentication code for integrity (short-MAC-I).

Specifically, the MAC-I or the short-MAC-I may be derived according to an integrity protection algorithm and based on the key stored in the context information of the terminal device. Alternatively, the MAC-I or the short-MAC-I may be derived according to an integrity protection algorithm and based on any one of the first to fourth implementations of generating the security key.

It should be understood that the first message carries the MAC-I or the short-MAC-I, so that integrity of the first message can be protected. Therefore, in this embodiment of this application, integrity can be protected during communication between the terminal device in the inactive state and the network device.

Specifically, in step 220, the terminal device sends the first message to the second network device by using an uplink resource of the second network device.

The terminal device may obtain the uplink resource of the second network device in a plurality of different manners.

(1) The terminal device may obtain a grant-free resource of the second network device by using a system message of the second network device.

Optionally, in some embodiments, the method 200 further includes: after the terminal device is moved to a cell of the second network device, obtaining, by the terminal device, the system message of the second network device, where the system message of the second network device carries preconfigured resource information; and obtaining, by the terminal device, the uplink resource of the second network device based on the preconfigured resource information.

Specifically, the preconfigured resource information indicates the grant-free resource of the second network device. For example, the grant-free resource is used to send a small data packet by the terminal device that is moved to the cell of the second network device and that is in the inactive state. The terminal device may determine the grant-free resource as the uplink resource.

Optionally, grant-free resources indicated by the preconfigured resource information are divided into several groups, and resource information of each group is used to indicate time domain and frequency domain locations of the group of resources and a corresponding signature (or sequence or index). Optionally, the several groups of resources indicated by the grant-free resource information are further divided into an initial transmission group, a retransmission group 1, a retransmission group 2, . . . , and a retransmission group m, where m is a positive integer.

When needing to send the uplink data and/or the signaling, the terminal device selects a resource from one group (for example, the initial transmission group) of the grant-free resources indicated by the grant-free resource information, to send the uplink data and/or the signaling.

Optionally, in this embodiment, when sending the uplink data and/or the signaling to the second network device, the terminal device further sends a signature and the identifier of the terminal device to the second network device. The signature is used to instruct the second network device to allocate a resource to the terminal device.

Optionally, in this embodiment, the terminal may further send any one or more of the following information to the second network device: a preconfiguration parameter index number, the MAC-I, a buffer status report (BSR), a count of PDCP packets and a packet sequence number (SN) of a PDCP packet, and information about the first network device.

Optionally, in this embodiment, if the terminal device fails in sending the uplink data and/or the signaling to the second network device by using the resource in the initial transmission group, the terminal device may continue sending the uplink data and/or the signaling by using a resource in a retransmission group.

In this embodiment, the terminal device determines the grant-free resource of the second network device as the uplink resource of the second network device, so that efficiency of communication with the second network device can be improved.

(2) The terminal device may obtain the uplink resource of the second network device through a random access (RA) process.

Optionally, in some embodiments, the method 200 further includes: after the terminal device is moved to a cell of the second network device, obtaining, by the terminal device, a system message of the second network device; initiating, by the terminal device, the RA process to obtain a grant-free resource of the second network device; and when the terminal device needs to send the uplink data, sending, by the terminal device, a preamble sequence to the second network device, where the preamble sequence is used to instruct the second network device to allocate a resource to the terminal device. Optionally, the method may further include: sending the identifier of the terminal device; and receiving, by the terminal device, a resource that is allocated based on the preamble sequence and that is sent by the second network device. Optionally, the method further includes: sending, by the terminal device to the second network device, a buffer status report (BSR) based on the resource allocated by the second network device; and sending, by the second network device, an uplink grant resource (UL Grant) to the terminal device based on the BSR sent by the terminal device, that is, obtaining, by the terminal device, the uplink resource of the second network device.

Specifically, the terminal device further sends an RRC connection request to the second network device based on the UL Grant sent by the second network device. The RRC connection request carries the identifier of the terminal device.

It should be understood that, after the terminal device obtains the system message of the second network device, the terminal device reads public land mobile network (PLMN) information in the system message, to determine that a radio access technology (RAT) type of the cell of the second network device is different from a RAT type of a cell of the first network device.

It should be further understood that, if the terminal device learns, by reading the system message, that a RAN-based paging area (PA) of the second network device is the same as a PA of the first network device, the terminal device does not initiate RAN-based paging area update signaling to the second network device. If the terminal device learns, by reading the system message, that a RAN-based PA of the second network device is different from a PA of the first network device, that is, a PA change occurs, the terminal device may initiate RAN-based paging area update signaling to the second network device.

Optionally, in some embodiments, the system message of the second network device further carries user plane (UP) preconfiguration parameter information corresponding to at least one service, and the method 200 further includes: determining, by the terminal device, the to-be-sent uplink data based on the service corresponding to the preconfiguration parameter information. In other words, in step 220, the terminal device sends the uplink data to the second network device based on the service corresponding to the preconfiguration parameter information.

Specifically, for example, the preconfiguration parameter information may further include PDCP, RLC, MAC, or PHY configuration information, and a PDCP configuration index number, an RLC configuration index number, a MAC configuration index number, or a PHY configuration index number.

In this embodiment, for example, in a scenario in which the terminal device needs to add a new service and send data of a new service type, the terminal device can send data of the at least one service to the second network device based on the preconfiguration parameter information without establishing an RRC connection to the second network device, so that efficiency of data transmission between the terminal device and the switched-to network device is improved.

Optionally, in some embodiments, the system message of the second network device further carries user plane preconfiguration parameter information corresponding to at least one type of quality of service (QoS), and the method 200 further includes: determining, by the terminal device, the to-be-sent uplink data based on the QoS corresponding to the preconfiguration parameter information.

In this embodiment, the terminal device can send data corresponding to the at least one type of QoS to the second network device based on the preconfiguration parameter information without establishing an RRC connection to the second network device, so that efficiency of data transmission between the terminal device and the switched-to network device is improved.

(3) The terminal device obtains the uplink resource of the second network device from the first network device.

Optionally, in some embodiments, the RRC release message sent by the first network device to the terminal device further carries a preconfigured grant-free uplink resource of at least one cell, for example, a preconfigured grant-free uplink resource of a cell of another network device that is in a same RAN-based paging area (RAN-based PA) as the first network device. Assuming that the second network device and the first network device are in a same RAN-based paging area, after receiving the RRC release message sent by the first network device, the terminal device may obtain a preconfigured grant-free uplink resource of the second network device.

Optionally, in the foregoing some embodiments, the terminal device may send the first message by using data signaling or control signaling at a MAC layer.

For example, the terminal device sends the first message by using a MAC protocol data unit (MAC PDU).

Optionally, in the foregoing some embodiments, the terminal device may send the first message to the second network device by using a user plane data packet.

For example, the terminal device sends the first message by using a user PDCP.

Optionally, in the foregoing some embodiments, the terminal device may send the first message to the second network device by using RRC signaling.

Specifically, in step 230, the first network device sends the information about the security key to the second network device, so that the second network device may subsequently parse, based on the security key, the uplink data and/or the signaling sent by the terminal device.

The information that is sent by the first network device and that is about the security key may be parameter information used to generate the security key, or may be the security key. It should be noted that the security key corresponding to the information that is sent by the first network device and that is about the security key is the same as the security key that is obtained by the terminal device in step 210. For example, if in step 210, the terminal device uses, as the security key, the key stored in the context information, the information that is sent by the first network device to the second network device and that is about the security key may be the context information. If in step 210, the terminal device generates the security key based on the identification information of the second network device and the key that is stored in the context information (which corresponds to the above described second implementation of obtaining the security key), the information that is sent by the first network device to the second network device and that is about the security key includes the context information and indication information that is used to indicate the identification information of the second network device (or includes the context information and the identification information of the second network device).

Specifically, after step 240, the second network device may indirectly or directly send, to the core network, the uplink data and/or the signaling sent by the terminal device.

Optionally, in an embodiment, the first message sent by the terminal device further includes the identification information of the first network device, and the identification information of the first network device includes the cell information of the first network device and/or device information of the first network device; and the communication method 200 further includes: sending, by second network device, the uplink data and/or the signaling to the first network device based on the identification information of the first network device, so that the first network device sends the uplink data to the core network, where the signaling is non-access stratum signaling.

It should be understood that the foregoing embodiment describes a solution in which the second network device indirectly sends, to the core network, the uplink data and/or the signaling sent by the terminal device.

Optionally, in an implementation, the identifier of the terminal device may carry the identification information of the first network device. In this case, when the first message carries the identifier of the terminal device, the second network device can obtain the identification information of the first network device.

Specifically, the cell information of the first network device is, for example, the cell index or the cell identifier of the first network device. The device information of the first network device is, for example, a device number, GPRS tunneling protocol (GTP) tunnel endpoint information, an IP address, or a MAC address of the first network device. The GTP tunnel endpoint information includes a transport layer address and a tunnel endpoint identifier (TEID).

In this embodiment of this application, the second network device forwards the uplink data and/or the signaling of the terminal device to the core network by using the first network device on which the terminal device previously camps, so that communication efficiency can be improved, and costs can be reduced.

It should be noted that, in the solution in which the second network device indirectly sends the uplink data and/or the signaling to the core network, if the terminal device sends the first message to the second network device by using a PDCP SDU, namely, an IP packet, the second network device may directly forward the first message to the first network device. If the terminal device sends the first message to the second network device by using a PDCP PDU, an RLC PDU, a MAC PDU, or a layer 1 code stream, before the second network device sends the first message to the first network device, the first network device needs to perform terminal device-related configuration, for example, including user plane configuration, on the second network device.

Optionally, in an embodiment, the method 200 further includes: obtaining, by the second network device, the context information; establishing, by the second network device, a communication path to the core network based on the context information; and sending, by the second network device, the uplink data and/or signaling to the core network along the communication path.

It should be understood that the second network device may obtain data transmission path information of the terminal device from the context information.

It should be understood that the foregoing embodiment describes a solution in which the second network device directly sends, to the core network, the uplink data and/or the signaling sent by the terminal device.

In this embodiment of this application, the second network device is connected to the core network based on the context information, so that the second network device can forward the uplink data of the terminal device to the core network without establishing an RRC connection to the terminal device.

Optionally, in some embodiments, the second network device may obtain the context information by using a terminal device context notification message that is sent by the first network device in advance.

Optionally, in some embodiments, the second network device may request the context information from the first network device after receiving the first message of the terminal device.

In other words, when the second network device does not store the context information, the second network device may request the context information from the first network device on which the terminal device previously camps.

Optionally, in an embodiment in which the second network device directly sends the uplink data to the core network, the method further includes: obtaining, by the second network device, information about a new NCC from the core network; sending, by the second network device, the new NCC to the terminal device, so that the terminal device is instructed to determine a new security key by using the new NCC and encrypt, by using the new security key, uplink data to be sent next time; and generating, by the terminal device, a newer security key based on the new NCC and the new security key, and using the newer security key for encryption in a subsequent data transmission process.

In this embodiment, after data transmission between the second network device and the terminal device is performed at least once, a newer security key is determined, so that data transmission security can be further improved.

Optionally, in an embodiment in which the second network device directly sends the uplink data to the core network, the method further includes: determining, by the second network device, whether the context information needs to be updated.

Specifically, the second network device determines, based on at least one of the following information, whether the context information needs to be updated: an amount of the uplink data of the terminal device, a sending frequency of the uplink data of the terminal device, load of the second network device, a quantity of users connected to the second network device, or uplink service information of the terminal device.

For example, as specified in a protocol, when the amount of the uplink data of the terminal device exceeds a threshold, or when the sending frequency of the uplink data of the terminal device exceeds a threshold, or when the load of the second network device exceeds a threshold, or when the quantity of the users connected to the second network device exceeds a threshold, or when the uplink service information of the terminal device meets a preset condition, the second network device determines that the context information needs to be updated.

Optionally, in some embodiments, the method 200 further includes: sending, by the second network device, a response message to the terminal device, where the response message includes the identifier of the terminal device.

It should be understood that the response message is used to notify the terminal device that the second network device successfully receives the first message sent by the terminal device.

Optionally, the response message further includes at least one of the following information: information for instructing whether to update the context information, information for instructing whether to enter an RRC connected state, information for instructing whether to remain in the inactive state, new security information, update information of a radio access network area, information for instructing to enter the RRC connected state, information for instructing to remain in the inactive state, or information for instructing to enter an RRC idle state; and the method 200 further includes: performing, by the terminal device, a corresponding operation based on instruction information carried in the response message.

For example, when the response message includes instruction information used to instruct to update the context information, the terminal device releases the previously retained context, to be ready to receive a new context that is configured by the second network device for the terminal device. When the response message includes the instruction information used to instruct to enter the RRC connected state, the terminal device sends an RRC connection request to the second network device. When the response message includes the instruction information used to instruct to remain in the inactive state, the terminal device continues remaining in the inactive state, that is, does not establish an RRC connection to the second network device.

Optionally, if the response message sent by the second network device and received by the terminal device indicates failure feedback, or the response message is received, the terminal device may perform the following action: releasing the stored context information, and entering the idle state, or remaining in the inactive state, and reselecting a cell (a network device) after a security information rollback, to initiate a process of establishing communication with the network device again, or remaining in the inactive state, and reselecting a cell (a network device) after a security information rollback, to enter an RRC connection establishment procedure, or reselecting a cell (a network device) after a security information rollback, to enter an RRC connection reestablishment procedure.

It should be understood that a reason why the terminal receives the failure feedback of the second network device or receives no feedback may include any one or a combination of the following factors: security verification fails, a configuration fails to provide support, a function fails to provide support, a configuration is invalid, and a timer expires.

To better understand the communication method provided in this embodiment of this application, the following describes some specific embodiments in detail with reference to FIG. 3 to FIG. 6.

Figure 3:
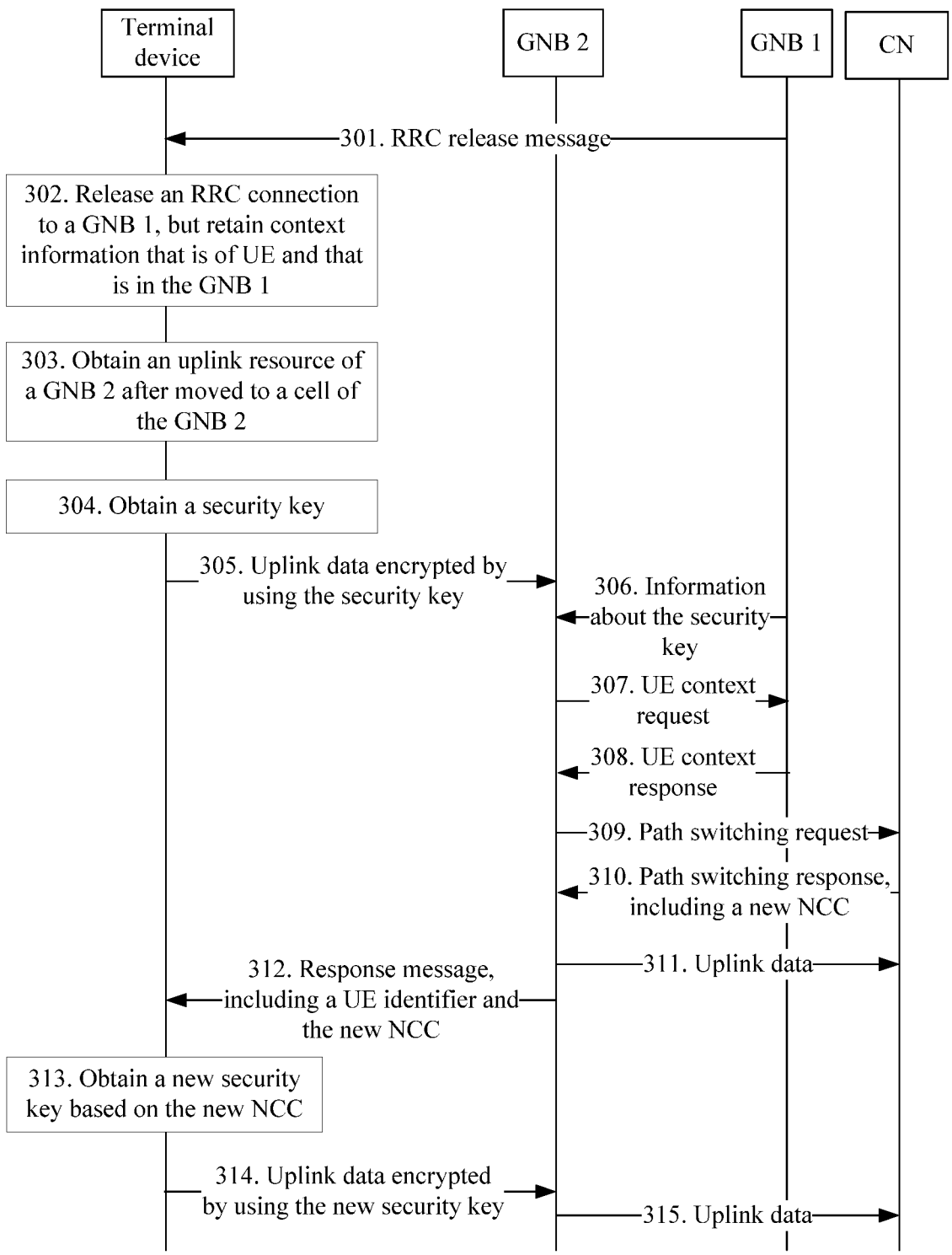
FIG. 3 is another schematic flowchart of a communication method according to an embodiment of this application.

FIG. 3 is another schematic flowchart of a communication method according to an embodiment of this application. For ease of description, in description of FIG. 3, a GNB 1 is used to represent a first network device, a GNB 2 is used to represent a second network device, and a CN (Core Network) is used to represent a core network device. It should be understood that the GNB 1 and the GNB 2 are used for differentiation only for ease of description and are not used for limiting the scope of this embodiment of this application. As shown in FIG. 3, the method includes the following steps.

301. The GNB 1 sends an RRC release message to a terminal device.

Optionally, the RRC release message may implicitly instruct the terminal device to enter an inactive state. For example, the RRC release message carries an instruction for instructing the terminal device to enter the inactive state. Optionally, the RRC release message may alternatively explicitly instruct the terminal device to enter an inactive state. For example, the RRC release message directly instructs the terminal device to enter a non-connected state.

When the RRC release message explicitly instructs the terminal device to enter the inactive state, the RRC release message may be, for example, an RRC message, MAC signaling, or physical layer control signaling. The RRC release message may be a unicast message, a multicast message, or a broadcast message.

302. The terminal device releases an RRC connection to the GNB 1, but retains context information that is of the terminal device and that is in the GNB 1, that is, enters an inactive (RRC inactive) state.

303. The terminal device obtains an uplink resource of the GNB 2 after moved to a cell of the GNB 2.

Optionally, the uplink resource of the GNB 2 may be obtained by using a system message of the GNB 2.

Optionally, a random access (RA) process may alternatively be performed to request the GNB 2 to allocate the uplink resource to the terminal device.

For a detailed description, refer to the foregoing description. Details are not described herein again.

304. The terminal device obtains a security key.

Specifically, the security key may be a key stored in the context information. Alternatively, the security key is determined based on identification information of the GNB 2 and a key stored in the context information. Alternatively, the security key is determined based on identification information of the GNB 2 and security information configured by the GNB 1. The security information is, for example, the above described security information that is configured by the GNB 1 for the terminal device and that is needed when the terminal device initiates RRC connection resumption or sends uplink data next time. Alternatively, the security key is determined based on identification information of the GNB 1 and security information configured by the GNB 1. The identification information of the GNB (the GNB 1 or the GNB 2) mentioned herein may be cell information of the GNB or frequency information of the GNB.

305. The terminal device sends uplink data (DATA) to the GNB 2 by using the uplink resource of the GNB 2, and further sends an identifier of the terminal device.

The identifier of the terminal device may be an identifier generated by the terminal device, or may be an identifier allocated by the GNB 1 to the terminal device in a connected state, or may be an identifier allocated by the GNB 1 to the terminal device in the inactive state.

Optionally, in step 306, when sending the identifier of the terminal device and the uplink data, the terminal device may further send a MAC-I or a short MAC-I. The MAC-I or the short MAC-I may be derived from the security key.

The terminal device sends the uplink data to the GNB 2 by using the security key, and further sends the MAC-I to ensure data integrity protection, so that security of data transmission between the terminal device and the GNB 2 can be effectively improved.

306. The GNB 2 obtains information about the security key by using the GNB 1. The GNB 2 parses, based on the information about the security key, the uplink data sent by the terminal device.

For a detailed description, refer to the foregoing description about step 23o. Details are not described herein again.

307. After receiving the uplink data sent by the terminal device, the GNB 2 finds that the context information does not exist locally, and requests the context information from the GNB 1 on which the terminal device previously camps.

308. The GNB 1 sends, to the GNB 2, a terminal device context request response used to indicate the context information.

It should be understood that, after obtaining the context information, the GNB 2 may obtain a data transmission path of the terminal device in the connected state.

Optionally, the GNB 2 may locally store the context information.

309. The GNB 2 sends a path switching request to the CN based on the context information.

310. The CN sends a path switching request response to the GNB 2, where the path switching request response may include a new NCC.

The new NCC is used to determine a new security key.

311. The GNB 2 sends, to the CN, the uplink data sent by the terminal device.

312. The GNB 2 sends a response message to the terminal device, where the response message includes the identifier of the terminal device and the new NCC sent by the CN, and may further include the MAC-I.

It should be understood that the identifier of the terminal device is used to indicate that the GNB 2 successfully receives the uplink data sent by the terminal device. The new NCC is used to instruct the terminal device to determine the new security key based on the new NCC. The MAC-I is used to protect integrity.

If the GNB 2 does not give a clear instruction, the terminal device may continue remaining in the inactive (RRC inactive) state.

313. The terminal device obtains, based on the new NCC, a new security key for encryption.

314. The terminal device sends encrypted uplink data to the GNB 2, sends the identifier of the terminal device, and further sends the MAC-I, where the uplink data is encrypted by using the new security key.

315. The GNB 2 forwards, to the core network, the uplink data sent by the terminal device.

Optionally, the GNB 2 may send a response message to the terminal device. The response message includes the identifier of the terminal device and the MAC-I.

Optionally, if the response message sent by the GNB 2 and received by the terminal device indicates failure feedback, or if no response message is received, the terminal device may perform the following action: releasing the stored context information, and entering the idle state, or remaining in the inactive state, and reselecting a cell (a network device) after a security information rollback, to initiate a process of establishing communication with the network device again, or remaining in the inactive state, and reselecting a cell (a network device) after a security information rollback, to enter an RRC connection establishment procedure, or reselecting a cell (a network device) after a security information rollback, to enter an RRC connection reestablishment procedure.

It should be understood that a reason why the terminal receives the failure feedback of the GNB 2 or receives no feedback may include any one or a combination of the following factors: security verification fails, a configuration fails to provide support, a function fails to provide support, a configuration is invalid, and a timer expires.

In this implementation, the terminal device may remain in the inactive state all the time, and perform data transmission with the GNB 2 based on the context information. Alternatively, the terminal device may send an RRC connection resume request to the GNB 2 to enter the connected state, and perform data transmission with the GNB 2.

In this embodiment, the data is encrypted by using the security key during data transmission between the terminal device in the inactive state and the network device GNB 2, so that data transmission security can be effectively improved.

Figure 4:
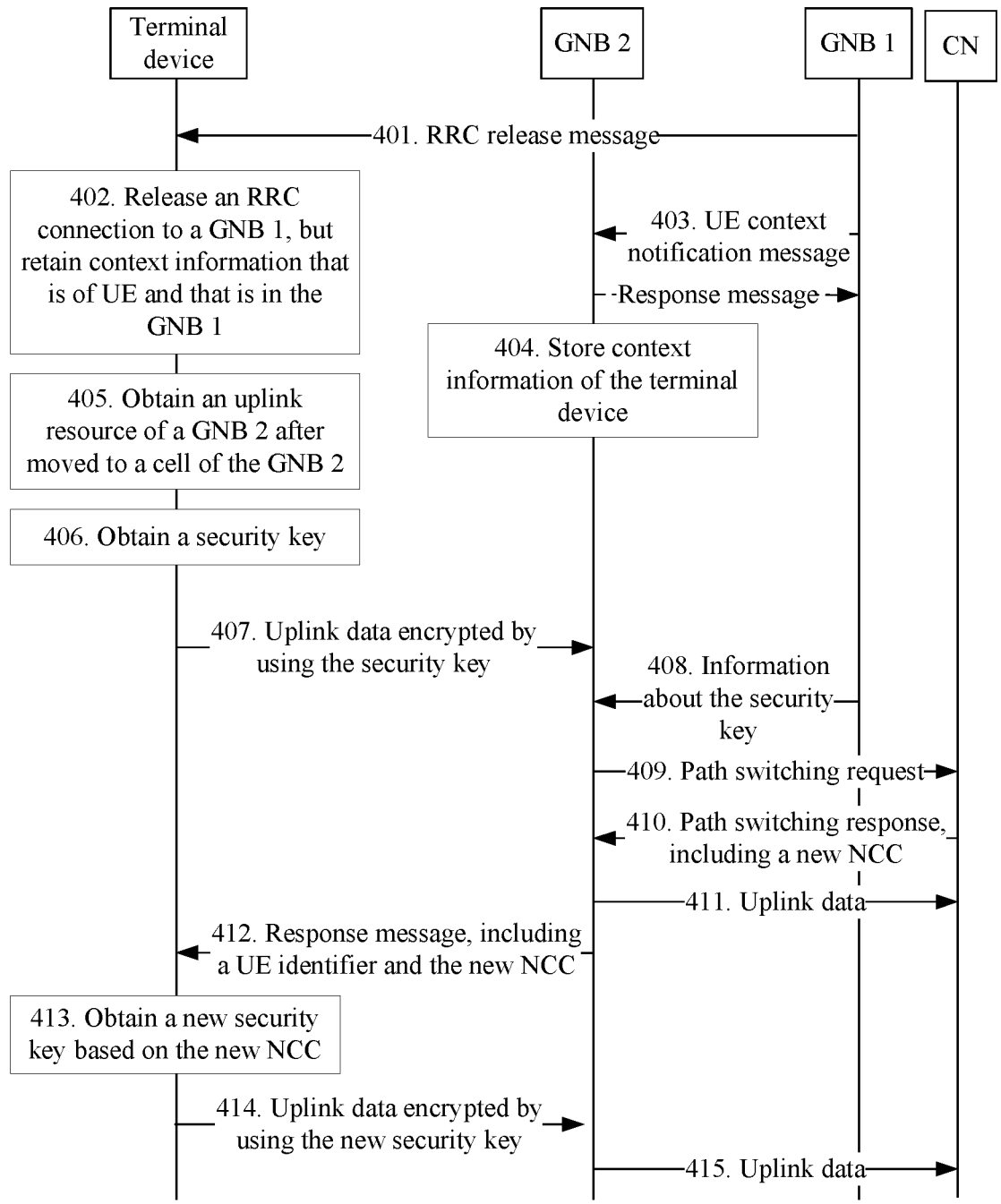
FIG. 4 is still another schematic flowchart of a communication method according to an embodiment of this application.

FIG. 4 is still another schematic flowchart of a communication method according to an embodiment of this application. Similarly, in description of FIG. 4, a GNB 1 is used to represent a first network device, a GNB 2 is used to represent a second network device, and a CN (Core Network) is used to represent a core network device. It should be understood that the GNB 1 and the GNB 2 are used for differentiation only for ease of description and are not used for limiting the scope of this embodiment of this application. As shown in FIG. 4, the method includes the following steps.

401. The GNB 1 sends an RRC release message to a terminal device. Step 401 is the same as step 301.

402. The terminal device releases an RRC connection to the GNB 1, but retains the context information, that is, enters an inactive (RRC inactive) state. Step 402 is the same as step 302.

403. The GNB 1 sends a context information notification message to neighboring network devices (including the GNB 2), where the context information notification message includes the context information of the terminal device.

Optionally, after receiving the context notification message sent by the GNB 1, the GNB 2 may send a response message to the GNB 1.

404. The GNB 2 obtains the context information based on the context notification message sent by the GNB 1, and stores the context information.

It should be understood that, after obtaining the context information, the GNB 2 may obtain a data transmission path of the terminal device in a connected state.

As shown in FIG. 4, the GNB 2 may further send a response message for the context notification message to the GNB 1.

405. The terminal device obtains an uplink resource of the GNB 2 after moved to a cell of the GNB 2. Step 405 is the same as step 303.

406. The terminal device obtains a security key. Step 406 is the same as step 304.

407. The terminal device sends uplink data (DATA) to the GNB 2 by using the uplink resource of the GNB 2, and further sends an identifier of the terminal device. Step 407 is the same as step 306.

It should be noted that, in this embodiment, step 403 and step 404 are performed before step 407. Steps 403 and 404 and steps 401 and 402 are not limited to a strict order.

408. The GNB 2 obtains information about the security key by using the GNB 1. The GNB 2 parses, based on the information about the security key, the uplink data sent by the terminal device.

For a detailed description, refer to the foregoing description about step 23*o*. Details are not described herein again.

409. After receiving the uplink data sent by the terminal device, the GNB 2 sends a path switching request to the CN based on the context information. Step 409 is the same as step 309.

410. The CN sends a path switching request response to the GNB 2, where the path switching request response may include a new NCC.

The new NCC is used to determine a new security key. Step 410 is the same as step 310.

411. The GNB 2 sends, to the CN, the uplink data sent by the terminal device. Step 411 is the same as step 311.

412. The GNB 2 sends a response message to the terminal device, where the response message includes the identifier of the terminal device and the new NCC sent by the CN, and may further include a MAC-I. Step 412 is the same as step 312.

It should be understood that the identifier of the terminal device is used to indicate that the GNB 2 successfully receives the uplink data sent by the terminal device. The new NCC is used to instruct the terminal device to determine the new security key based on the new NCC. The MAC-I is used to protect integrity.

If the GNB 2 does not give a clear instruction, the terminal device continues remaining in the inactive (RRC inactive) state.

413. The terminal device obtains, based on the new NCC, a new security key for encryption. Step 413 is the same as step 313.

414. The terminal device sends encrypted uplink data to the GNB 2, sends the identifier of the terminal device, and further sends the MAC-I, where the uplink data is encrypted by using the new security key. Step 414 is the same as step 314.

415. The GNB 2 forwards, to the core network, the uplink data sent by the terminal device. Step 415 is the same as step 315.

Optionally, the GNB 2 may send a response message to the terminal device. The response message includes the identifier of the terminal device and the MAC-I.

Optionally, if the response message sent by the GNB 2 and received by the terminal device indicates failure feedback, or if no response message is received, the terminal device may perform the following action: releasing the stored context information, and entering the idle state, or remaining in the inactive state, and reselecting a cell (a network device) after a security information rollback, to initiate a process of establishing communication with the network device again, or remaining in the inactive state, and reselecting a cell (a network device) after a security information rollback, to enter an RRC connection establishment procedure, or reselecting a cell (a network device) after a security information rollback, to enter an RRC connection reestablishment procedure.

It should be understood that a reason why the terminal receives the failure feedback of the GNB 2 or receives no feedback may include any one or a combination of the following factors: security verification fails, a configuration fails to provide support, a function fails to provide support, a configuration is invalid, and a timer expires.

It can be learned through comparison between FIG. 3 and FIG. 4 that, in the embodiment shown in FIG. 4, because the GNB 2 obtains in advance the context information (in step 403 and step 404 shown in FIG. 4) by using the context information notification message sent by the GNB 1, after receiving the uplink data sent by the terminal device, the GNB 2 can directly forward the uplink data to the core network by using the locally stored context information, so that data transmission efficiency can be effectively improved, and a transmission delay can be effectively reduced.

In this implementation, the terminal device may remain in the inactive state all the time, and perform data transmission with the GNB 2 based on the context information. Alternatively, the terminal device may send an RRC connection resume request to the GNB 2 to enter the connected state, and perform data transmission with the GNB 2.

Figure 5:
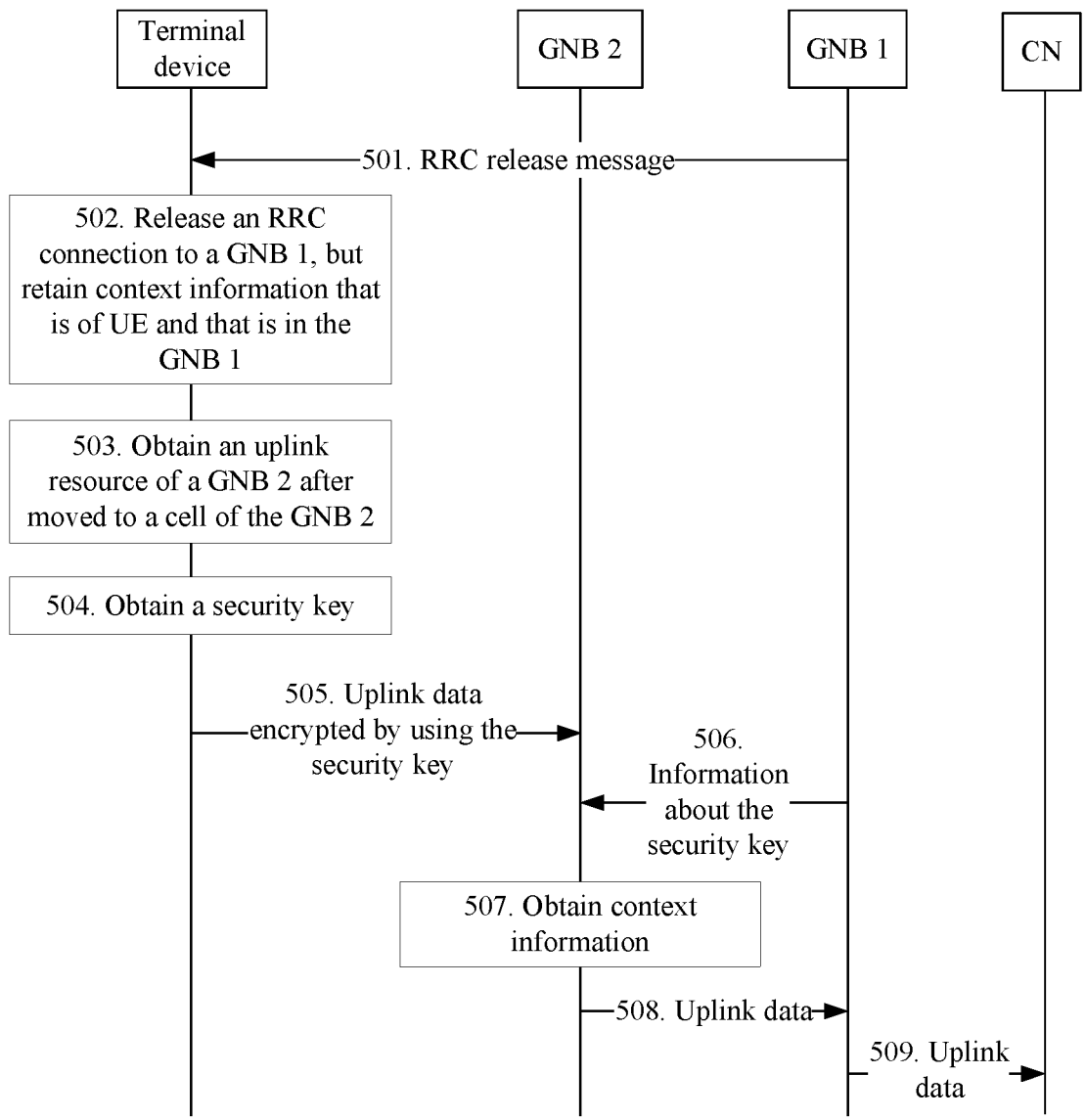
FIG. 5 is yet another schematic flowchart of a communication method according to an embodiment of this application.

In the description of FIG. 3 and FIG. 4, the GNB 2 directly forwards the uplink data of the terminal device to the core network. With reference to FIG. 5, the following describes a solution in which the GNB 2 indirectly forwards the uplink data of the terminal device to the core network by using the GNB 1.

FIG. 5 is yet another schematic flowchart of a communication method according to an embodiment of this application. Similarly, in description of FIG. 5, a GNB 1 is used to represent a first network device, and a GNB 2 is used to represent a second network device. It should be understood that the GNB 1 and the GNB 2 are used for differentiation only for ease of description and are not used for limiting the scope of this embodiment of this application. As shown in FIG. 5, the method includes the following steps.

501. The GNB 1 sends an RRC release message to a terminal device. Step 501 is the same as step 301.

502. The terminal device releases an RRC connection to the GNB 1, but retains context information that is of the terminal device and that is in the GNB 1, that is, enters an inactive (RRC inactive) state. Step 502 is the same as step 302.

503. The terminal device obtains an uplink resource of the GNB 2 after moved to a cell of the GNB 2. Step 503 is the same as step 303.

504. The terminal device obtains a security key. Step 504 is the same as step 304.

505. The terminal device sends uplink data (DATA) to the GNB 2 by using the uplink resource of the GNB 2, and further sends an identifier of the terminal device. Step 505 is the same as step 305.

506. The GNB 2 obtains information about the security key by using the GNB 1.

For a detailed description, refer to the foregoing description about step 230. Details are not described herein again.

507. The GNB 2 obtains identification information of the GNB 1. The identification information of the GNB 1 includes cell information of the GNB 1 and/or device information of the GNB 1. For a specific explanation, refer to the foregoing related description.

508. The GNB 2 sends the uplink data of the terminal device to the GNB 2 based on the identification information of the GNB 1.

509. The GNB 1 forwards the uplink data of the terminal device to a CN.

Figure 6:
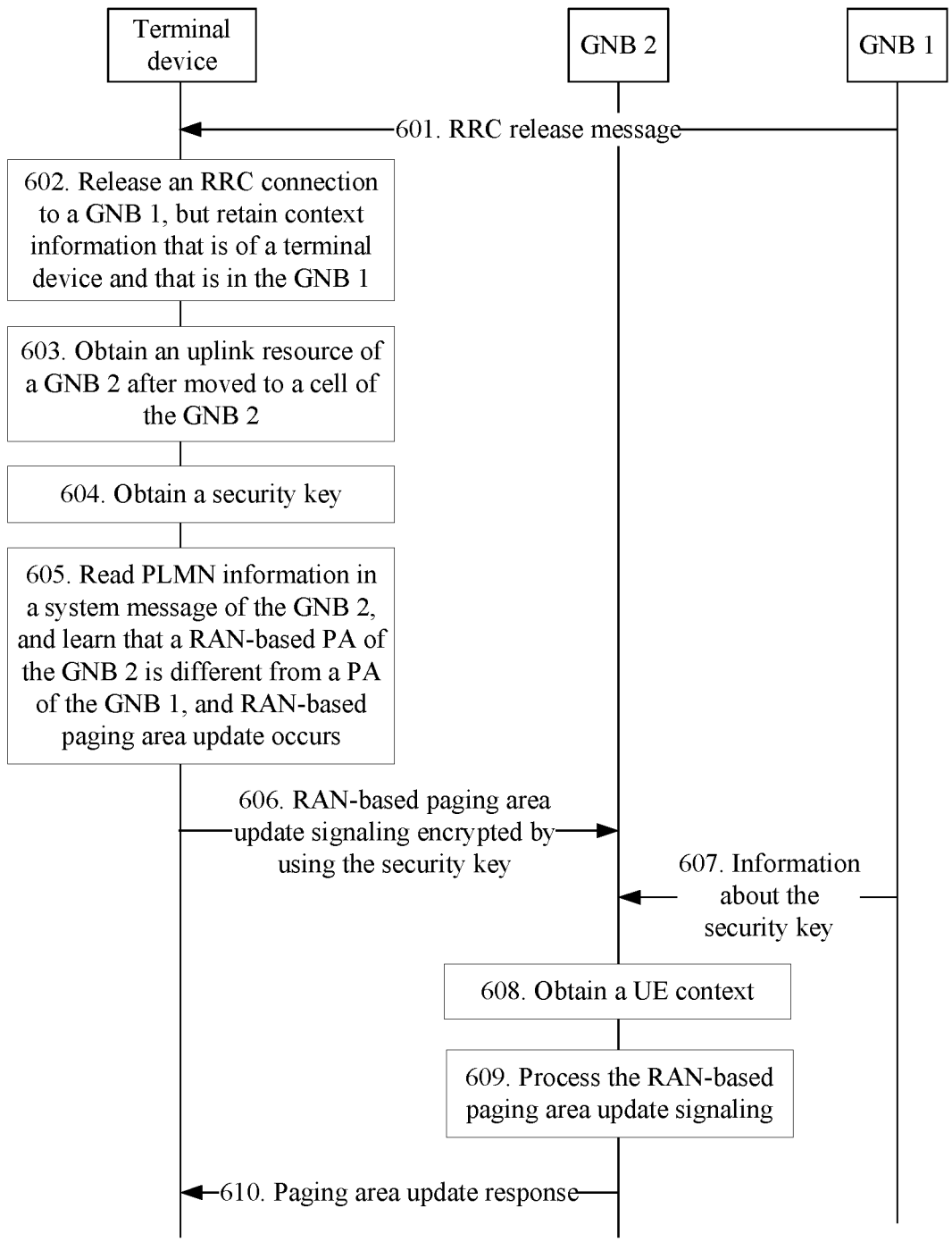
FIG. 6 is still yet another schematic flowchart of a communication method according to an embodiment of this application.

FIG. 6 is still yet another schematic flowchart of a communication method according to an embodiment of this application. Similarly, in description of FIG. 6, a GNB 1 is used to represent a first network device, and a GNB 2 is used to represent a second network device. It should be understood that the GNB 1 and the GNB 2 are used for differentiation only for ease of description and are not used for limiting the scope of this embodiment of this application. As shown in FIG. 6, the method includes the following steps.

601. The GNB 1 sends an RRC release message to a terminal device. Step 601 is the same as step 301.

602. The terminal device releases an RRC connection to the GNB 1, but retains context information that is of the terminal device and that is in the GNB 1, that is, enters an inactive (RRC inactive) state. Step 602 is the same as step 302.

603. The terminal device obtains an uplink resource of the GNB 2 after moved to a cell of the GNB 2. Step 603 is the same as step 303.

604. The terminal device obtains a security key. Step 604 is the same as step 304.

605. After the terminal device obtains a system message of the GNB 2, the terminal device reads PLMN information in the system message, learns that a RAT type of the cell of the GNB 2 is different from a RAT type of a cell of the GNB 1, and further learns that a RAN-based paging area (Paging Area, PA) of the GNB 2 is different from a PA of the GNB 1, that is, RAN-based paging area update occurs.

606. The terminal device sends encrypted RAN-based paging area update signaling to the GBN2 based on the uplink resource of the GNB 2, and further sends an identifier of the terminal device and a MAC-I. The RAN-based paging area update signaling is encrypted by using the security key.

The terminal device in the inactive state sends the RAN-based paging area update signaling to the GNB 2 by using the security key, and further sends the MAC-I to ensure data integrity protection, so that security of data transmission between the terminal device and the GNB 2 can be effectively improved.

607. The GNB 2 obtains information about the security key by using the GNB 1.

For a detailed description, refer to the foregoing description about step 230. Details are not described herein again.

608. The GNB 2 obtains the context information after receiving the RAN-based paging area update signaling sent by the terminal device.

Specifically, the GNB 2 may obtain the context information by using the method shown in FIG. 3 or FIG. 4.

For example, if the GNB 2 finds, after receiving the RAN-based paging area update signaling sent by the terminal device, that the context information does not exist locally, the GNB 2 requests the context information from the GNB 1 on which the terminal device previously camps, as described in step 306 and step 307 shown in FIG. 3.

For another example, before receiving the RAN-based paging area update signaling sent by the terminal device, the GNB 2 has received a context information notification message sent by the GNB 1, as described in step 403 and step 404 shown in FIG. 4. In this case, after receiving the RAN-based paging area update signaling sent by the terminal device, the GNB 2 can directly process the RAN-based paging area update signaling by using the locally stored context information.

609. The GNB 2 processes the RAN-based paging area update signaling.

The GNB 2 parses the RAN-based paging area update signaling based on the information about the security key.

610. The GNB 2 sends a RAN-based paging area update response including the identifier of the terminal device to the terminal device.

In this implementation, the terminal device may remain in the inactive state all the time, and perform data transmission with the GNB 2 based on the context information. Alternatively, the terminal device may send an RRC connection resume request to the GNB 2 to enter a connected state, and perform data transmission with the GNB 2.

In this embodiment, the terminal device in the inactive state may send the RAN-based paging area update signaling to the network device, and perform encryption by using the security key, so that signaling transmission security can be improved.

The foregoing describes the communication methods provided in the embodiments of this application with reference to FIG. 2 to FIG. 6. The following describes a terminal device and a network device that are provided in the embodiments of this application with reference to FIG. 7 to FIG. 10.

Figure 7:
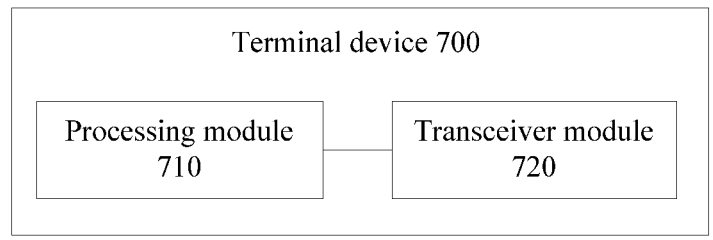
FIG. 7 is a schematic block diagram of a terminal device according to an embodiment of this application.

FIG. 7 is a schematic block diagram of a terminal device 700 according to an embodiment of this application. The terminal device 700 includes a processing module 710, configured to obtain a security key, where the terminal device is in a state in which the terminal device disconnects a RRC connection from a first network device but retains context information that is of the terminal device and that is in the first network device, and a transceiver module 720, configured to send a first message to a second network device, where the first message includes an identifier of the terminal device and encrypted uplink data and/or signaling, the encrypted uplink data and/or signaling is encrypted by using the security key, and the second network device is different from the first network device.

In this embodiment of this application, the security key is used for encryption during communication between the terminal device in the inactive state and the network device, so that communication security can be improved.

Optionally, in an embodiment, the security key includes a key stored in the context information.

Optionally, in an embodiment, the security key is different from a key that is used by the terminal device to communicate with the first network device.

Optionally, in an embodiment, that the processing module 710 is configured to obtain a security key includes the processing module 710 is configured to obtain the security key based on identification information of the second network device, where the identification information of the second network device includes cell information of the second network device and/or frequency information of the second network device.

Optionally, in an embodiment, the transceiver module 720 is further configured to obtain security information that is configured by the first network device for the terminal device, and that the processing module 710 is configured to obtain a security key includes the processing module 710 is configured to obtain the security key based on the security information and identification information of the second network device, where the identification information of the second network device includes cell information of the second network device and/or frequency information of the second network device, or the processing module 710 is configured to obtain the security key based on the security information and identification information of the first network device, where the identification information of the first network device includes cell information of the first network device and/or frequency information of the first network device.

Optionally, in an embodiment, the processing module 710 is further configured to obtain the security key by using any one of the following information a counter value carried in the context information, a counter value obtained from the first network device, a counter value carried in a system message of the first network device, or a counter value predefined by a system.

Optionally, in an embodiment, the first message includes the uplink data, and the processing module 710 is further configured to: after the terminal device is moved to a cell of the second network device, obtain a system message of the second network device, where the system message includes user plane preconfiguration parameter information corresponding to at least one service; and determine the uplink data based on the service corresponding to the preconfiguration parameter information.

Optionally, in an embodiment, the first message is sent by using a user plane data packet.

Optionally, in an embodiment, the first message further includes the identification information of the first network device, so that the second network device sends the uplink data and/or the signaling to a core network by using the first network device, where the identification information of the first network device includes the cell information of the first network device and/or device information of the first network device, and the signaling is non-access stratum signaling.

Optionally, in an embodiment, the transceiver module 720 is further configured to receive a response message sent by the second network device, where the response message includes at least one of the following information the identifier of the terminal device, information for instructing whether to update the context information, information for instructing whether to enter an RRC connected state, information for instructing whether to remain in the inactive state, new security information, or update information of a radio access network area.

It should be understood that the processing module 710 in this embodiment of this application may be implemented by a processor or a processor-related circuit component, and the transceiver module 720 may be implemented by a transceiver or a transceiver-related circuit component.

Figure 8:
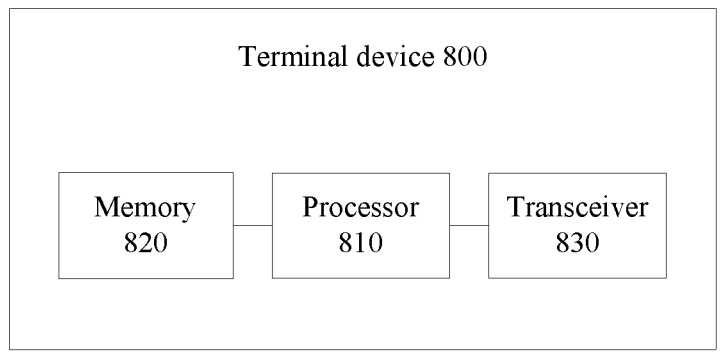
FIG. 8 is another schematic block diagram of a terminal device according to an embodiment of this application.

As shown in FIG. 8, an embodiment of this application further provides a terminal device 800. The terminal device 800 includes a processor 810, a memory 820, and a transceiver 830. The memory 820 stores an instruction or a program. The processor 810 is configured to execute the instruction or the program stored in the memory 82o. When the instruction or the program stored in the memory 820 is executed, the processor 810 is configured to perform an operation performed by the processing module 710 in the foregoing embodiment, and the transceiver 830 is configured to perform an operation performed by the transceiver module 720 in the foregoing embodiment.

In this embodiment of this application, a security key is used for encryption during communication between the terminal device in an inactive state and a network device, so that communication security can be improved.

Figure 9:
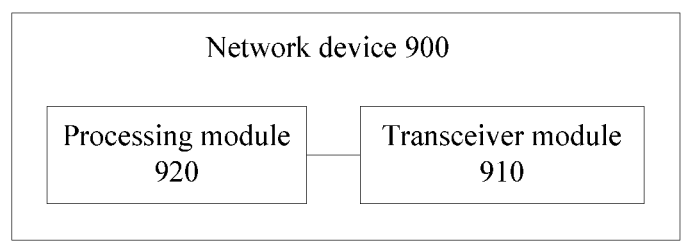
FIG. 9 is a schematic block diagram of a network device according to an embodiment of this application.

FIG. 9 is a schematic flowchart of a network device 900 according to an embodiment of this application. The network device 900 includes a transceiver module 910, configured to receive a first message sent by a terminal device, where the first message includes an identifier of the terminal device and encrypted uplink data and/or signaling, the encrypted uplink data and/or signaling is encrypted by using a security key, the terminal device is in a state in which the terminal device disconnects a RRC connection from a first network device but retains context information that is of the terminal device and that is in the first network device, and the first network device is different from the network device, and a processing module 920, configured to obtain information about the security key by using the first network device, where the processing module 920 is further configured to parse the uplink data and/or the signaling based on the information about the security key.

In this embodiment of this application, the security key is used for encryption during communication between the terminal device in the inactive state and the network device, so that communication security can be improved.

Optionally, in an embodiment, the security key includes a key stored in the context information.

Optionally, in an embodiment, the security key is different from a key that is used by the terminal device to communicate with the first network device.

Optionally, in an embodiment, the security key is determined based on identification information of the network device, and the identification information of the network device includes cell information of the network device and/or frequency information of the network device.

Optionally, in an embodiment, the security key is determined based on identification information of the network device and security information that is configured by the first network device for the terminal device, and the identification information of the network device includes cell information of the network device and/or frequency information of the network device; or the security key is determined based on identification information of the first network device and the security information, and the identification information of the first network device includes cell information of the first network device and/or frequency information of the first network device.

Optionally, in an embodiment, it is determined that the information about the security key further includes any one of the following information: a counter value stored in the context information, a counter value obtained by the terminal device from the first network device, a counter value carried in a system message of the first network device, or a counter value predefined by a system.

Optionally, in an embodiment, the first message includes the uplink data, and a system message of the network device includes user plane preconfiguration parameter information corresponding to at least one service, so that the terminal device determines the uplink data based on the service corresponding to the preconfiguration parameter information.

Optionally, in an embodiment, the first message is sent by using a user plane data packet.

Optionally, in an embodiment, the first message further includes the identification information of the first network device, and the identification information of the first network device includes the cell information of the first network device and/or device information of the first network device, and the transceiver module 910 is further configured to send the uplink data and/or the signaling to the first network device based on the identification information of the first network device, so that the first network device sends the uplink data and/or the signaling to a core network, where the signaling is non-access stratum signaling.

Optionally, in an embodiment, the first message includes the uplink data, the processing module 920 is further configured to obtain the context information, and establish, by the network device, a communication path to the core network based on the context information, and the transceiver module 910 is further configured to send the uplink data to the core network along the communication path.

Optionally, in an embodiment, the processing module 920 is further configured to obtain the context information, and the processing module 920 is configured to obtain the context information based on a context information notification sent by the first network device, or the processing module 920 is configured to request the context information from the first network device.

Optionally, in an embodiment, the processing module 920 is further configured to obtain information about a new next hop chaining counter NCC from the core network, and the transceiver module 910 is further configured to send the new NCC to the terminal device, so that the terminal device is instructed to determine a new security key by using the new NCC and encrypt, by using the new security key, uplink data to be sent next time.

Optionally, in an embodiment, the processing module 920 is further configured to determine, based on at least one of the following information, whether the context information needs to be updated: an amount of the uplink data of the terminal device, a sending frequency of the uplink data of the terminal device, load of the network device, a quantity of users connected to the network device, or uplink service information of the terminal device.

Optionally, in an embodiment, the transceiver module 910 is further configured to send a response message for the first message to the terminal device, where the response message includes at least one of the following information: the identifier of the terminal device, information for instructing whether to update the context information, information for instructing whether to enter an RRC connected state, information for instructing whether to remain in the inactive state, new security information, or update information of a radio access network area.

It should be understood that the processing module 920 in this embodiment of this application may be implemented by a processor or a processor-related circuit component, and the transceiver module 910 may be implemented by a transceiver or a transceiver-related circuit component.

Figure 10:
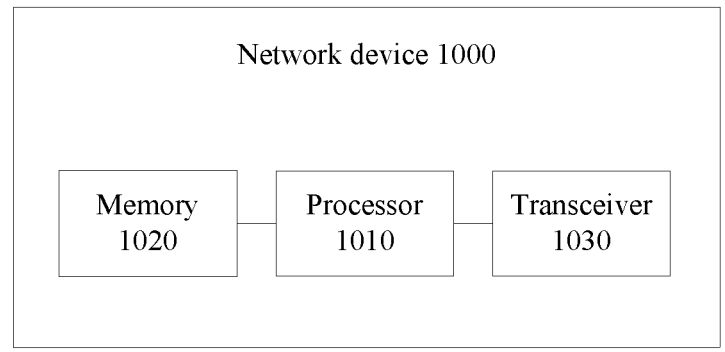
FIG. 10 is another schematic block diagram of a network device according to an embodiment of this application.

As shown in FIG. 10, an embodiment of this application further provides a network device 1000. The network device 1000 includes a processor 1010, a memory 1020, and a transceiver 1030. The memory 1020 stores an instruction or a program. The processor 1010 is configured to execute the instruction or the program stored in the memory 1020. When the instruction or the program stored in the memory 1020 is executed, the processor 1010 is configured to perform an operation performed by the processing module 920 in the foregoing embodiment, and the transceiver 1030 is configured to perform an operation performed by the transceiver module 910 in the foregoing embodiment.

In this embodiment of this application, a security key is used for encryption during communication between a terminal device in an inactive state and the network device, so that communication security can be improved.

An embodiment of this application further provides a communications apparatus. The communications apparatus may be a terminal device, or may be a circuit. The communications apparatus may be configured to perform an action performed by the terminal device in the foregoing method embodiments.

Figure 11:
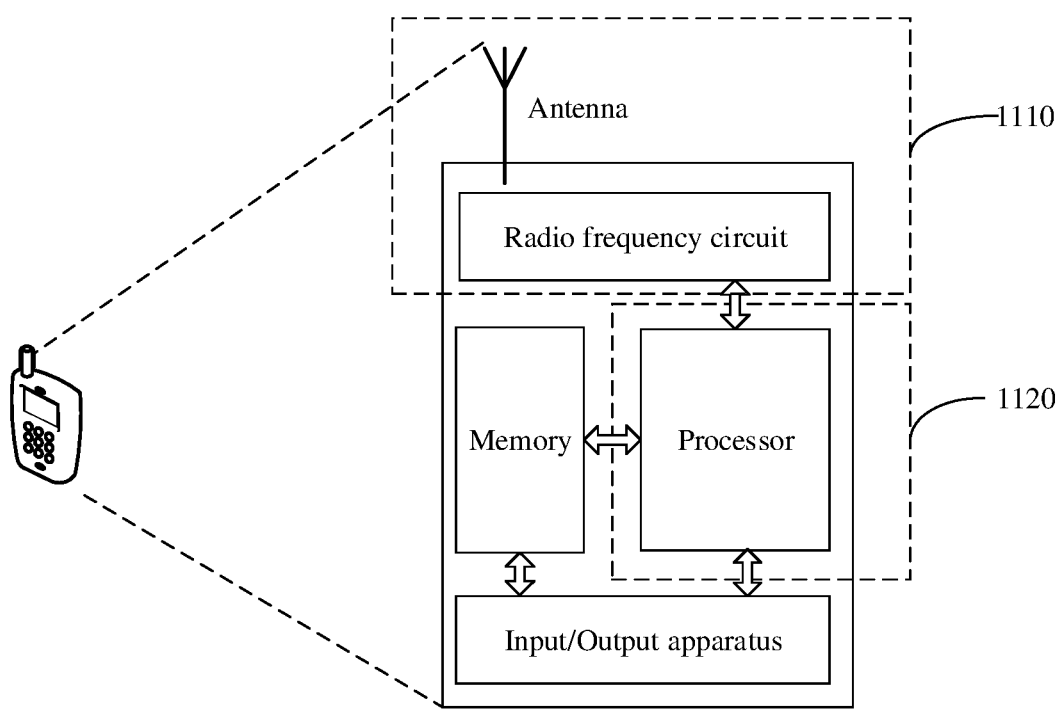
FIG. 11 is still another schematic block diagram of a terminal device according to an embodiment of this application.

When the communications apparatus is a terminal device, FIG. 11 is a simplified schematic structural diagram of the terminal device. For ease of understanding and illustration, in FIG. 11, a mobile phone is used as an example of the terminal device. As shown in FIG. 11, the terminal device includes a processor, a memory, a radio frequency circuit, an antenna, and an input/output apparatus. The processor is mainly configured to process a communications protocol and communication data, control the terminal device, execute a software program, process data of the software program, and the like. The memory is mainly configured to store the software program and the data. The radio frequency circuit is mainly configured to convert a baseband signal and a radio frequency signal into each other and process the radio frequency signal. The antenna is mainly configured to receive and send radio frequency signals in an electromagnetic wave form. The input/output apparatus, for example, a touchscreen, a display screen, or a keyboard, is mainly configured to receive data input by a user and output data to the user. It should be noted that some types of terminal devices may not have an input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal to the outside through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 merely shows one memory and one processor. An actual terminal device product may include one or more processors and one or more memories. The memory may also be referred to as a storage medium, a storage device, or the like. The memory may be disposed separate from the processor, or may be integrated with the processor. This is not limited in this embodiment of this application.

In this embodiment of this application, the antenna and the radio frequency circuit that have a transceiver function may be considered as a transceiver unit of the terminal device, and the processor having a processing function may be considered as a processing unit of the terminal device. As shown in FIG. 11, the terminal device includes a transceiver unit 1110 and a processing unit 1120. The transceiver unit may also be referred to as a transceiver, a transceiver device, a transceiver apparatus, or the like. The processing unit may also be referred to as a processor, a processing board, a processing module, a processing apparatus, or the like. Optionally, a device that is in the transceiver unit 1110 and that is configured to implement a receiving function may be considered as a receiving unit, and a device that is in the transceiver unit 1110 and that is configured to implement a sending function may be considered as a sending unit. In other words, the transceiver unit 1110 includes the receiving unit and the sending unit. The transceiver unit sometimes may also be referred to as a transceiver device, a transceiver, a transceiver circuit, or the like. The receiving unit sometimes may also be referred to as a receive device, a receiver, a receive circuit, or the like. The sending unit sometimes may also be referred to as a transmit device, a transmitter, a transmit circuit, or the like.

It should be understood that the transceiver unit 1110 is configured to perform a sending operation and a receiving operation on a terminal device side in the foregoing method embodiments, and the processing unit 1120 is configured to perform another operation, other than the receiving and sending operations, on the terminal device in the foregoing method embodiments.

For example, in an implementation, the transceiver unit 1110 is configured to perform the sending operation on the terminal device side in step 220 in FIG. 2, and/or the transceiver unit 1110 is further configured to perform other receiving and sending steps on the terminal device side in the embodiments of this application. The processing unit 1120 is configured to perform step 210 in FIG. 2, and/or the processing unit 1120 is further configured to perform another processing step on the terminal device side in the embodiments of this application.

For another example, in another implementation, the transceiver unit 1110 is configured to perform receiving operations on the terminal device side in step 301 and step 312 or the sending operation on the terminal device side in step 305 in FIG. 3, and/or the transceiver unit 1120 is further configured to perform other receiving and sending steps on the terminal device side in the embodiments of this application. The processing unit 1120 is configured to perform step 302, step 303, and step 304 in FIG. 3, and/or the processing unit 1120 is further configured to perform another processing step on the terminal device side in the embodiments of this application.

For still another example, in still another implementation, the transceiver unit 1110 is configured to perform receiving operations on the terminal device side in step 401 and step 412 or the sending operations on the terminal device side in step 407 and step 414 in FIG. 4, and/or the transceiver unit 1110 is further configured to perform other receiving and sending steps on the terminal device side in the embodiments of this application. The processing unit 1120 is configured to perform step 402, step 405, step 406, and step 413 in FIG. 4, and/or the processing unit 1120 is further configured to perform another processing step on the terminal device side in the embodiments of this application.

For yet another example, in yet another implementation, the transceiver unit 1110 is configured to perform a receiving operation on the terminal device side in step 501 or the sending operation on the terminal device side in step 505 in FIG. 5, and/or the transceiver unit 1110 is further configured to perform other receiving and sending steps on the terminal device side in the embodiments of this application. The processing unit 1120 is configured to perform step 502, step 503, and step 504 in FIG. 5, and/or the processing unit 1120 is further configured to perform another processing step on the terminal device side in the embodiments of this application.

For still yet another example, in still yet another implementation, the transceiver unit 1110 is configured to perform receiving operations on the terminal device side in step 601 and step 610 or the sending operation on the terminal device side in step 606 in FIG. 6, and/or the transceiver unit 1110 is further configured to perform other receiving and sending steps on the terminal device side in the embodiments of this application. The processing unit 1120 is configured to perform step 602, step 603, step 604, and step 605 in FIG. 6, and/or the processing unit 1120 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit that is integrated to the chip.

It should be understood that the processor mentioned in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that, when the processor is the general-purpose processor, the DSP, the ASIC, the FPGA or another programmable logic device, the discrete gate or transistor logic device, or the discrete hardware component, the memory (storage module) is integrated into the processor.

It should be noted that the memory described in this specification is intended to include, but not limited to, these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes various media that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   disconnecting, by a terminal device, a radio resource control (RRC) connection from a first network device in response to an RRC release message received by the terminal device from the first network device;
   obtaining, by the terminal device, according to information in the RRC release message, a security key, wherein the terminal device performs the obtaining after the disconnecting, and while the terminal device is in a state in which the terminal device has disconnected the RRC connection, and in which the terminal device retains context information for a context, in the first network device, of the terminal device, wherein the security key is generated between the terminal device and the first network device according to a system definition or a protocol specification; and
   sending, by the terminal device, a first message to a second network device, wherein the first message comprises an identifier of the terminal device and at least one of encrypted uplink data or encrypted signaling, wherein the at least one of encrypted uplink data or encrypted signaling is encrypted by using the security key, and wherein the second network device is different from the first network device;
   wherein the second network device receives information about the security key from the first network device, after the first message to the second network device is sent using the security key, and before a context request is sent from the second network device to the first network device.

2. The communication method according to claim 1, wherein the obtaining the security key comprises:
   obtaining, by the terminal device, the security key according to identification information of the second network device, wherein the identification information of the second network device comprises at least one of cell information of the second network device or frequency information of the second network device.

3. The communication method according to claim 1, wherein the communication method further comprises obtaining, by the terminal device, security information that is configured by the first network device for the terminal device; and wherein the obtaining the security key comprises performing at least one of:
  obtaining, by the terminal device, the security key according to the security information and identification information of the second network device, wherein the identification information of the second network device comprises at least one of cell information of the second network device or frequency information of the second network device; or
  obtaining, by the terminal device, the security key according to the security information and identification information of the first network device, wherein the identification information of the first network device comprises at least one of cell information of the first network device or frequency information of the first network device.

4. The communication method according to claim 3, wherein the obtaining the security key comprises obtaining, by the terminal device, the security key further according to at least one of:
  a counter value carried in the context information for a packet counter;
  a counter value obtained from the first network device for a packet counter;
  a counter value carried in a system message of the first network device for a packet counter; or
  a counter value predefined by a system for a packet counter.

5. The communication method according to claim 1, wherein the first message comprises the uplink data; and
  wherein the communication method further comprises:
    obtaining, by the terminal device, after the terminal device is moved to a cell of the second network device, a system message of the second network device, wherein the system message comprises user plane preconfiguration parameter information corresponding to at least one service; and
    determining, by the terminal device, the uplink data according to the service corresponding to the preconfiguration parameter information.

6. The communication method according to claim 1, wherein the first message further comprises identification information of the first network device, wherein the first message causes the second network device to send the at least one of the encrypted uplink data or the encrypted signaling to a core network by using the first network device, wherein the identification information of the first network device comprises at least one of cell information of the first network device or device information of the first network device, and wherein the encrypted signaling is non-access stratum signaling.

7. A terminal device, comprising:
  a transceiver;
  a processor; and
  a non-transitory computer-readable storage medium storing a program to be executed by the processor, the program including instructions to:
  disconnecting a radio resource control (RRC) connection from a first network device in response to receiving an RRC release message from the first network device;
  obtain a security key according to information in the RRC release message, wherein the instructions to obtain the security key cause the terminal device to obtain the security key after the disconnecting and while the terminal device is in a state in which the terminal device has disconnected the RRC connection from the first network device, and in which the terminal device retains context information for a context, in the first network device, of the terminal device, wherein the security key is generated between the terminal device and the first network device according to a system definition or a protocol specification; and
  cause the transceiver to send a first message to a second network device, wherein the first message comprises an identifier of the terminal device and at least one of encrypted uplink data or encrypted signaling, the at least one of the encrypted uplink data or the encrypted signaling is encrypted by using the security key, and wherein the second network device is different from the first network device;
  wherein the second network device receives information about the security key from the first network device, after the first message to the second network device is sent using the security key, and before a context request is sent from the second network device to the first network device.

8. The terminal device according to claim 7, wherein the instructions to obtain the security key include instructions to:
  obtain the security key according to identification information of the second network device, wherein the identification information of the second network device comprises at least one of cell information of the second network device or frequency information of the second network device.

9. The terminal device according to claim 7, wherein the program further includes instructions to obtain security information that is configured by the first network device for the terminal device; and
  wherein the instructions to obtain the security key include instructions to perform at least one of:
    obtain the security key according to security information and identification information of the second network device, wherein the identification information of the second network device comprises at least one of cell information of the second network device or frequency information of the second network device; or
    obtain the security key according the security information and identification information of the first network device, wherein the identification information of the first network device comprises at least one of cell information of the first network device or frequency information of the first network device.

10. The terminal device according to claim 9, wherein the instructions to obtain the security key include instructions to obtain the security key using at least one of:
  a counter value carried in the context information for a packet counter;
  a counter value obtained from the first network device for a packet counter;
  a counter value carried in a system message of the first network device for a packet counter; or
  a counter value predefined by a system for a packet counter.

11. The terminal device according to claim 7, wherein the first message comprises the uplink data; and
  wherein the program further includes instructions to:
    obtain, after the terminal device is moved to a cell of the second network device, a system message of the second network device, wherein the system message comprises user plane preconfiguration parameter information corresponding to at least one service; and determine the uplink data according to the at least one service.

12. The terminal device according to claim 7, wherein the first message further comprises identification information of the first network device, wherein the first message causes the second network device to send the at least one of the encrypted uplink data or the encrypted signaling to a core network by using the first network device, wherein the identification information of the first network device comprises at least one of cell information of the first network device or device information of the first network device, and wherein the encrypted signaling is non-access stratum signaling.

13. A network device, comprising:
a transceiver module;
a processor; and
a non-transitory computer-readable storage medium storing a program to be executed by the processor, the program including instructions to:
receive, through the transceiver, a first message sent by a terminal device, wherein the first message comprises an identifier of the terminal device and at least one of encrypted uplink data or encrypted signaling, wherein the at least one of the encrypted uplink data or encrypted signaling is encrypted using a security key, wherein the terminal device is in a state in which the terminal device has disconnected a radio resource control (RRC) connection from a first network device, and in which the terminal device retains context information for a context, in the first network device, of the terminal device, wherein the first network device is different from the network device, and wherein the security key is generated between the terminal device and the first network device according to a system definition or a protocol specification;
obtain information about the security key by using the first network device, wherein the information about the security key is obtained, after the first message is received using the security key, and before sending a context request to the first network device;
parse the at least one of the encrypted uplink data or the encrypted signaling according to the information about the security key; and
send, to the terminal device, a response message comprising a next hop chaining counter (NCC) for generating, by the terminal device a new security key.

14. The network device according to claim 13, wherein the security key is determined according to identification information of the network device, and wherein the identification information of the network device comprises at least one of cell information of the network device or frequency information of the network device.

15. The network device according to claim 13, wherein the security key is determined according to at least one of identification information of the network device and security information that is configured by the first network device for the terminal device and the identification information of the network device comprises at least one of cell information of the network device or frequency information of the network device, or according to identification information of the first network device and the security information and the identification information of the first network device comprises at least one of cell information of the first network device or frequency information of the first network device.

16. The network device according to claim 15, wherein the instructions to obtain the information about the security key include instructions to obtain information about the security key using at least one of:
a counter value stored in the context information for a packet counter;
a counter value obtained by the terminal device from the first network device for a packet counter;
a counter value carried in a system message of the first network device for a packet counter; or
a counter value predefined by a system for a packet counter.

17. The network device according to claim 13, wherein the first message comprises the uplink data, and wherein a system message of the network device comprises user plane preconfiguration parameter information corresponding to at least one service, and wherein the system message causes the terminal device to determine the uplink data according to the at least one service.

18. The network device according to claim 13, wherein the first message further comprises identification information of the first network device, and wherein the identification information of the first network device comprises at least one of cell information of the first network device or device information of the first network device; and
wherein the program further includes instructions to cause the transceiver to send the at least one of the encrypted uplink data or the encrypted signaling to the first network device according to the identification information of the first network device, so that the first network device sends the at least one of the encrypted uplink data or the encrypted signaling to a core network, wherein the signaling is non-access stratum signaling.

19. The network device according to claim 13, wherein the first message comprises the uplink data;
wherein the program further includes instructions to:
obtain the context information;
establish a communication path to a core network according to the context information; and
cause the transceiver to send the uplink data to the core network along the communication path.

20. The network device according to claim 19, wherein the instructions to obtain the context information include instructions to perform at least one of:
obtain the context information according to a context information notification sent by the first network device; or
request the context information from the first network device.

* * * * *